US008290827B2

(12) United States Patent
Piepenbrink et al.

(10) Patent No.: US 8,290,827 B2
(45) Date of Patent: Oct. 16, 2012

(54) METHOD, MEDIUM, AND SYSTEM OF PRESENTING ASSETS RELATED TO MEDIA CONTENT

(75) Inventors: David J. Piepenbrink, Chicago, IL (US); Lee Chow, Naperville, IL (US); Stephen Rys, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 342 days.

(21) Appl. No.: 11/728,046

(22) Filed: Mar. 23, 2007

(65) Prior Publication Data

US 2008/0235278 A1    Sep. 25, 2008

(51) Int. Cl.
*G06Q 30/00* (2012.01)
(52) U.S. Cl. ....................................................... 705/26.7
(58) Field of Classification Search ..................... 705/26, 705/27, 26.7, 14.49, 53; 725/32, 34
See application file for complete search history.

(56) References Cited

U.S. PATENT DOCUMENTS

| | | | | |
|---|---|---|---|---|
| 5,589,892 | A * | 12/1996 | Knee et al. ........................ | 725/43 |
| 6,507,727 | B1 * | 1/2003 | Henrick .......................... | 455/3.06 |
| 7,073,187 | B1 * | 7/2006 | Hendricks et al. .............. | 725/36 |
| 7,139,372 | B2 * | 11/2006 | Chakravorty et al. ... | 379/114.01 |
| 7,668,538 | B2 * | 2/2010 | Rosenberg et al. ......... | 455/414.1 |
| 2001/0052133 | A1 * | 12/2001 | Pack et al. ...................... | 725/109 |
| 2002/0037376 | A1 * | 3/2002 | Fenton ........................... | 428/34.9 |
| 2002/0052788 | A1 * | 5/2002 | Perkes et al. .................. | 705/14 |
| 2002/0062249 | A1 * | 5/2002 | Iannacci ......................... | 705/14 |
| 2002/0065713 | A1 * | 5/2002 | Awada et al. ................... | 705/14 |
| 2002/0067376 | A1 * | 6/2002 | Martin et al. .................. | 345/810 |
| 2002/0184623 | A1 * | 12/2002 | Hodge et al. ..................... | 725/37 |
| 2003/0056219 | A1 * | 3/2003 | Reichardt et al. ............... | 725/60 |
| 2003/0149988 | A1 * | 8/2003 | Ellis et al. ........................ | 725/87 |
| 2003/0151621 | A1 * | 8/2003 | McEvilly et al. ............. | 345/744 |
| 2003/0165138 | A1 * | 9/2003 | Swonk et al. .................. | 370/392 |
| 2003/0229900 | A1 * | 12/2003 | Reisman ......................... | 725/87 |
| 2003/0236709 | A1 * | 12/2003 | Hendra et al. .................. | 705/26 |
| 2005/0042983 | A1 * | 2/2005 | Borgward ..................... | 455/3.06 |
| 2005/0049933 | A1 * | 3/2005 | Upendran et al. .............. | 705/26 |
| 2005/0144641 | A1 * | 6/2005 | Lewis ............................. | 725/60 |
| 2005/0283800 | A1 * | 12/2005 | Ellis et al. ....................... | 725/40 |
| 2007/0156521 | A1 * | 7/2007 | Yates .............................. | 705/14 |
| 2007/0156539 | A1 * | 7/2007 | Yates .............................. | 705/26 |
| 2007/0268163 | A1 * | 11/2007 | Aydar et al. ..................... | 341/51 |
| 2007/0294721 | A1 * | 12/2007 | Haeuser et al. ................. | 725/34 |

OTHER PUBLICATIONS

SlingBox, Mar. 19, 2006 http://web.archive.org/web/20060419095448/http://electronics.howstuffworks.com/slingbox.html/printable.*
SlingBox, Mar. 19, 2006—http://web.archive.org/web/20060419095448/http://electronics.howstuffworks.com/slingbox.html/printable.*

* cited by examiner

*Primary Examiner* — Matthew Zimmerman
(74) *Attorney, Agent, or Firm* — Toler Law Group, PC

(57) ABSTRACT

In a particular embodiment, a method of presenting assets related to media content includes receiving data indicating a selection of a selectable trigger from a destination device and identifying video content associated with the selectable trigger. The method further includes providing an electronic storefront to the destination device in response to the data indicating the selection of the selectable trigger. A plurality of assets related to the video content can be purchased via the electronic storefront. The plurality of assets includes at least a first asset type and a second asset type.

21 Claims, 20 Drawing Sheets

METHOD, MEDIUM, AND SYSTEM OF PRESENTING ASSETS RELATED TO MEDIA CONTENT

FIELD OF THE DISCLOSURE

The present disclosure is generally related to presenting assets related to media content.

BACKGROUND

Television is a popular form of entertainment. Additionally, television can be a useful medium for presenting information or advertising. There have been attempts to encourage product purchases through television via images or video promotions. Such promotions provide information related to available goods and services, but they do not facilitate transactions. Hence, there is a need for an improved system and method of presenting assets related to media content.

DETAILED DESCRIPTION OF THE DRAWINGS

Figure 1:
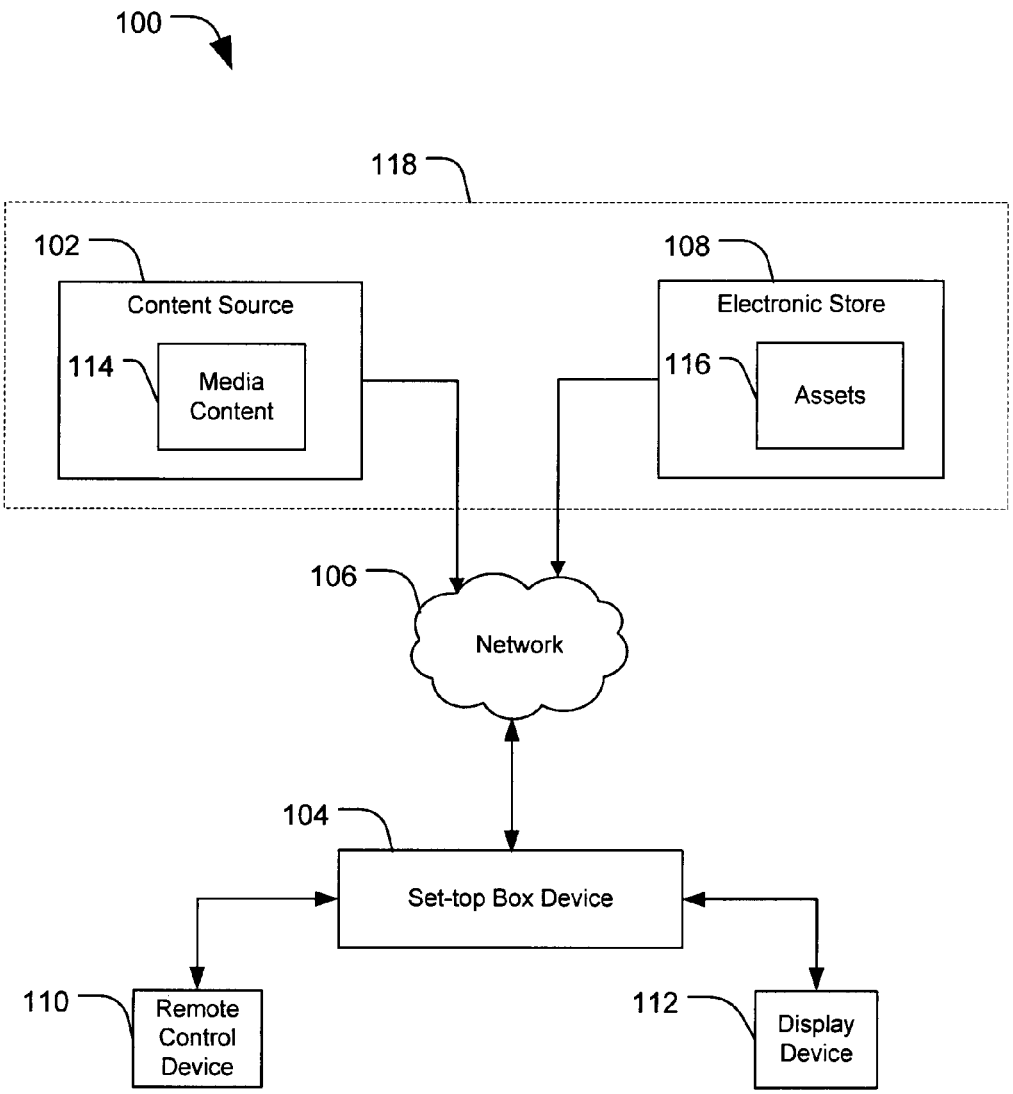
FIG. 1 is a block diagram of a particular illustrative embodiment of a system to present assets related to media content.

In a particular embodiment, a system is disclosed to present assets related to media content. The system includes a server system having processing logic and memory accessible to the processing logic. The memory includes instructions executable by the processing logic to receive data indicating a selection of a selectable trigger from a destination device and identify video content associated with the selectable trigger. The memory also includes instructions executable by the processing logic to provide an electronic storefront to the destination device in response to the data indicating the selection of the selectable trigger. A plurality of assets related to the video content can be purchased via the electronic storefront. The plurality of assets includes at least a first asset type and a second asset type.

In another particular embodiment, a set-top box device is disclosed that includes a processor and a memory accessible to the processor. The memory includes instructions executable by the processor to perform a method that includes receiving selected media content from a content source. The selected media content includes a selectable trigger associated with an electronic storefront. The memory also includes instructions executable by the processor to receive a selection of the selectable trigger, to send data related to the selection to a server system adapted to provide the electronic storefront, and to receive a graphical user interface including the electronic storefront. A plurality of assets related to the selected media content can be purchased via the electronic storefront, and the plurality of assets includes at least a first asset type and a second asset type.

In still another particular embodiment, a method of presenting assets related to media content is disclosed that includes receiving data indicating a selection of a selectable trigger from a destination device and identifying video content associated with the selectable trigger. The method further includes providing an electronic storefront to the destination device in response to the data indicating the selection of the selectable trigger, where plurality of assets related to the video content can be purchased via the electronic storefront and where the plurality of assets includes at least a first asset type and a second asset type.

In yet another particular illustrative embodiment, a method of presenting assets related to media content is disclosed that includes receiving selected media content from a content source, where the selected media content includes a selectable trigger associated with an electronic storefront. The method also includes receiving a selection of the selectable trigger and sending data related to the selection to a server system adapted to provide the electronic storefront. The method further includes receiving a graphical user interface including the electronic storefront, where a plurality of assets related to the selected media content can be purchased via the electronic storefront and where the plurality of assets includes at least a first asset type and a second asset type.

In another particular illustrative embodiment, a processor-readable medium is disclosed that includes processor executable instructions to perform a method of presenting assets related to media content. The method includes receiving data indicating a selection of a selectable trigger from a destination device, identifying video content associated with the selectable trigger, and providing an electronic storefront to the destination device in response to the data indicating the selection of the selectable trigger. A plurality of assets related to the video content can be purchased via the electronic storefront. The plurality of assets includes at least a first asset type and a second asset type.

FIG. 1 is a block diagram of a particular illustrative embodiment of a system 100 to present assets related to media content. The system 100 includes a content source 102 that communicates with a set-top box device 104 via a network 106. The content source 102 includes a memory to store media content 114. The set-top box device 104 can receive input from a remote control device 110 and can communicate audio and video to a display device 112. In a particular embodiment, the network 106 may be a public network, such as the Internet, or a private access network, such as a private Internet Protocol Television (IPTV) access network.

The content source 102 and the set-top box device 104 can communicate with an electronic store server 108 via the network 106. The electronic store server 108 includes data related to one or more assets 116, which may be related to the media content 114. In an illustrative embodiment, a server system 118 can include both the content source 102 and the electronic store 108, providing a single interface for media content distribution and for presenting assets related to the media content.

In a particular illustrative embodiment, the server system 118 receives a request for an electronic storefront from a destination device, such as the set-top box device 104. The server system 118 can identify media content received at the set-top box device 104 based on the request or based on data from the content server 102. The server system 118 (or the electronic store 108) can generate an electronic storefront that includes selectable indicators related to assets selected from the assets data 116 based on the media content. In a particular illustrative embodiment, the assets data 116 can include data related to physical assets and electronic assets that are related to the media content. For example, the physical assets may include articles of clothing (hats, shirts, jackets, other articles of clothing, or any combination thereof), posters (movie posters, actor photographs, other images, or any combination thereof), soundtracks (e.g., compact discs (CDs)), other physical products, or any combination thereof. The electronic assets can include digital wallpaper (movie images, actor images, other images, or any combination thereof), ring tones (audio clips from media content, soundtrack clips, other audio clips, or any combination thereof), downloadable soundtracks, Video on Demand (VoD) content, video clips, other electronic assets, or any combination thereof. In general, each of the assets may have different associated access rights. For example, a ring tone electronic asset may allow unrestricted use of the ring tone after purchase, while a movie download may allow a limited number of viewings or unlimited access for a period of time.

In a particular illustrative embodiment, the server system 118 generates an electronic storefront including a graphical user interface. The graphical user interface includes multiple selectable indicators related to assets that are associated with media content that is received at the set-top box device 104. The server system 118 can target specific assets to the set-top box device 104 based on media content received at the set-top box device 104.

In a particular illustrative embodiment, the graphical user interface may include information describing the selected ones of the assets 116 or describing a plurality of purchase options related to the selected assets. The information may be personalized to a user or subscriber of the set-top box device 104. In another particular embodiment, the information describing the asset or the information describing the plurality of purchase options may be personalized to an account associated with the set-top box device 104.

In a particular embodiment, the server system 118 may provide a plurality of purchase options, including non-exclusive offers and exclusive customized offers. The exclusive customized offers may be based on past purchase history, viewing history, geographic location, length of service with a service provider, time of day, an account status, a type of account. The non-exclusive offers or the exclusive offers may be based on a sponsorship setting of a particular television program, a sponsorship of a particular television channel, or a sponsorship of the television program service. For example, the sponsorship setting may include information about television advertisers that have certain interactive features associated with their advertising content or with other television content. For example, advertisers may associate with this advertising content interactive features such as: information gathering interactive features (e.g., polls); entertainment interactive features (e.g., games); informative interactive features (e.g., product information queries); product request interactive features (e.g., order forms); or any combination thereof.

In another particular illustrative embodiment, the information describing an asset may include information related to a promotion. For example, the server system 118 may be adapted to cross-sell products for a particular promotion. The promotion may be directed to a particular movie, such as King Kong, where particular regions may be targeted for the promotion. Subscribers in San Antonio, Tex., for example, may receive discounted pricing for accessing the movie "King Kong." Such pricing promotions may be used to entice viewers to access such services.

In a particular embodiment, the promotion may have specific assets associated with it, such as a particular movie. In a particular embodiment, the particular promotion may include multiple related assets, such as the movie and products related to the movie, such as t-shirts, baseball hats, coffee cups, shot glasses, compact discs (CDs), other paraphernalia, or any combination thereof. Additionally, the promotion may include multiple related electronic assets, such as video clips, computer desktop wallpaper, a downloadable soundtrack, ring tones for a mobile phone, other electronic assets, or any combination thereof. Further, the promotion may include a discounted subscription service, such as an option to modify a subscription associated with the destination device to add a movie channel package, to subscribe to a number of VoD movies per month, another service, or any combination thereof.

More than one promotion may be associated with a particular asset. In a particular embodiment, multiple promotions from more than one asset provider may be included in asset data 116, and multiple purchase options may be provided for accessing selected assets. In a particular embodiment, the server system 118 may provide an interactive feature to direct a customer to an asset that has is associated with a particular promotion. For example, if a destination device 104 is associated with a subscriber in the San Antonio, Tex. area, the server system 118 may provide a graphical user interface that includes multiple promotional offers that are available to a particular subscriber. The server system 118 may provide a feature that allows the user device 104 to provide a display of a best promotional offer (e.g. lowest price, largest number of related assets, popular promotional options based on selections by other subscribers, other criteria, or any combination thereof). In a particular illustrative embodiment, the server system 118 may recommend a particular payment option from multiple available payment options. The recommendation may be based on the subscriber account associated with the set-top box device 104, based on an active promotion, based on payment option expiration (such as an expiration date associated with a payment coupon or credit), or any combination thereof.

In a particular illustrative embodiment, the set-top box device 104 may receive data that can be executed by a processor to generate a graphical user interface, which may be provided to the display device 112. The graphical user interface can include multiple purchasable assets of different types and multiple related purchase options. The set-top box device 104 may receive an input related to one or more of the multiple purchasable assets and an associated purchase option via the remote control device 110. The set-top box device 104 can send a request to the server system 118 that is related to the input.

Figure 2:
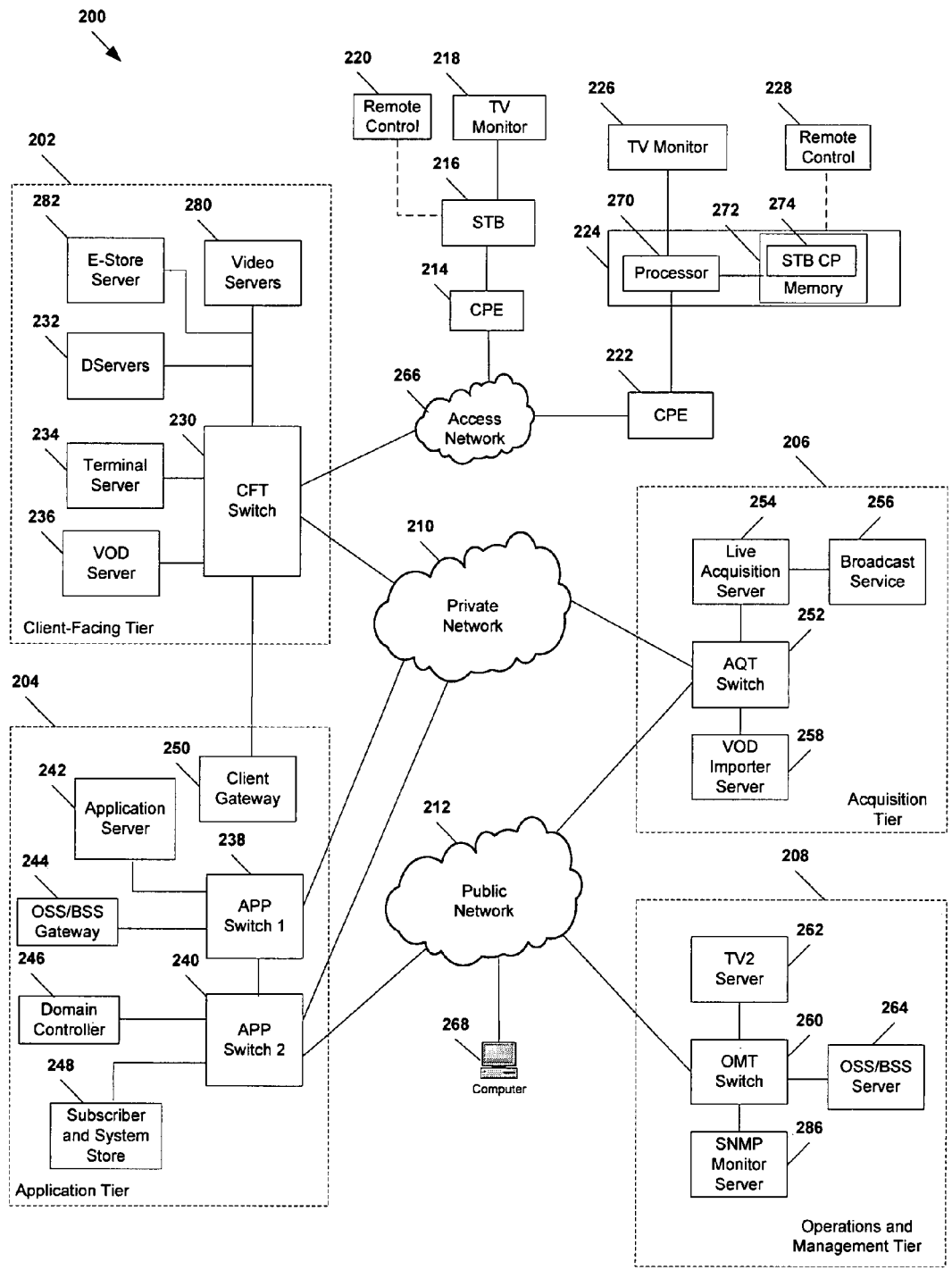
FIG. 2 is a block diagram of a second particular illustrative embodiment of a system to present assets related to media content.

FIG. 2 is a block diagram of an illustrative embodiment of an Internet Protocol Television (IPTV) system 200 that may be used to present assets related to media content. As shown, the system 200 can include a client facing tier 202, an application tier 204, an acquisition tier 206, and an operations and management tier 208. Each tier 202, 204, 206, 208 is coupled to a private network 210; to a public network 212, such as the Internet; or to both the private network 210 and the public network 212. For example, the client-facing tier 202 can be coupled to the private network 210. Further, the application tier 204 can be coupled to the private network 210 and to the public network 212. The acquisition tier 206 can also be coupled to the private network 210 and to the public network 212. Additionally, the operations and management tier 208 can be coupled to the public network 212.

As illustrated in FIG. 2, the various tiers 202, 204, 206, 208 communicate with each other via the private network 210 and the public network 212. For instance, the client-facing tier 202 can communicate with the application tier 204 and the acquisition tier 206 via the private network 210. The application tier 204 can communicate with the acquisition tier 206 via the private network 210. Further, the application tier 204 can communicate with the acquisition tier 206 and the operations and management tier 208 via the public network 212. Moreover, the acquisition tier 206 can communicate with the operations and management tier 208 via the public network 212. In a particular embodiment, elements of the application tier 204, including, but not limited to, a client gateway 250, can communicate directly with the client-facing tier 202.

The client-facing tier 202 can communicate with user equipment via an access network 266, such as an Internet Protocol Television (IPTV) access network. In an illustrative embodiment, customer premises equipment (CPE) 214, 222 can be coupled to a local switch, router, or other device of the access network 266. The client-facing tier 202 can communicate with a first representative set-top box device 216 via the first CPE 214 and with a second representative set-top box device 224 via the second CPE 222. In a particular embodiment, the first representative set-top box device 216 and the first CPE 214 can be located at a first customer premise, and the second representative set-top box device 224 and the second CPE 222 can be located at a second customer premise. In another particular embodiment, the first representative set-top box device 216 and the second representative set-top box device 224 can be located at a single customer premise, both coupled to one of the CPE 214, 222. The CPE 214, 222 can include routers, local area network devices, modems, such as digital subscriber line (DSL) modems, any other suitable devices for facilitating communication between a set-top box device and the access network 266, or any combination thereof.

In an exemplary embodiment, the client-facing tier 202 can be coupled to the CPE 214, 222 via fiber optic cables. In another exemplary embodiment, the CPE 214, 222 can be digital subscriber line (DSL) modems that are coupled to one or more network nodes via twisted pairs, and the client-facing tier 202 can be coupled to the network nodes via fiber-optic cables. Each set-top box device 216, 224 can process data received via the access network 266, via an IPTV software platform, such as Microsoft® TV IPTV Edition.

The first set-top box device 216 can be coupled to a first external display device, such as a first television monitor 218, and the second set-top box device 224 can be coupled to a second external display device, such as a second television monitor 226. Moreover, the first set-top box device 216 can communicate with a first remote control 220, and the second set-top box device 224 can communicate with a second remote control 228. The set-top box devices 216, 224 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 216, 224 can receive data, video, or any combination thereof, from the client-facing tier 202 via the access network 266 and render or display the data, video, or any combination thereof, at the display device 218, 226 to which it is coupled. In an illustrative embodiment, the set-top box devices 216, 224 can include tuners that receive and decode television programming signals or packet streams for transmission to the display devices 218, 226. Further, the set-top box devices 216, 224 can include a STB processor 270 and a STB memory device 272 that is accessible to the STB processor 270. In one embodiment, a computer program, such as the STB computer program 274, can be embedded within the STB memory device 272.

In an illustrative embodiment, the client-facing tier 202 can include a client-facing tier (CFT) switch 230 that manages communication between the client-facing tier 202 and the access network 266 and between the client-facing tier 202 and the private network 210. As illustrated, the CFT switch 230 is coupled to one or more data servers, such as D-servers 232, that store, format, encode, replicate, or otherwise manipulate or prepare video content for communication from the client-facing tier 202 to the set-top box devices 216, 224. The CFT switch 230 can also be coupled to a terminal server 234 that provides terminal devices with a point of connection to the IPTV system 200 via the client-facing tier 202. In a particular embodiment, the CFT switch 230 can be coupled to a video-on-demand (VOD) server 236 that stores or provides VOD content imported by the IPTV system 200. Further, the CFT switch 230 is coupled to one or more video servers 280 that receive video content and transmit the content to the set-top boxes 216, 224 via the access network 266. In a particular embodiment, the CFT switch 230 can also be coupled to an electronic store server 282 that stores and provides data related to purchasable assets to user devices, such the set-top box devices 216 and 224.

In an illustrative embodiment, the client-facing tier 202 can communicate with a large number of set-top boxes, such as the representative set-top boxes 216, 224, over a wide geographic area, such as a metropolitan area, a viewing area, a statewide area, a regional area, a nationwide area or any other suitable geographic area, market area, or subscriber or customer group that can be supported by networking the client-facing tier 202 to numerous set-top box devices. In a particular embodiment, the CFT switch 230, or any portion thereof, can include a multicast router or switch that communicates with multiple set-top box devices via a multicast-enabled network.

As illustrated in FIG. 2, the application tier 204 can communicate with both the private network 210 and the public network 212. The application tier 204 can include a first application tier (APP) switch 238 and a second APP switch 240. In a particular embodiment, the first APP switch 238 can be coupled to the second APP switch 240. The first APP switch 238 can be coupled to an application server 242 and to an OSS/BSS gateway 244. In a particular embodiment, the application server 242 can provide applications to the set-top box devices 216, 224 via the access network 266, which enable the set-top box devices 216, 224 to provide functions, such as interactive program guides, video gaming, display, messaging, processing of VOD material and other IPTV content, etc. In an illustrative embodiment, the application server 242 can provide location information to the set-top box devices 216, 224. In a particular embodiment, the OSS/BSS gateway 244 includes operation systems and support (OSS) data, as well as billing systems and support (BSS) data. In one embodiment, the OSS/BSS gateway 244 can provide or restrict access to an OSS/BSS server 264 that stores operations and billing systems data.

The second APP switch 240 can be coupled to a domain controller 246 that provides Internet access, for example, to users at their computers 268 via the public network 212. For example, the domain controller 246 can provide remote Internet access to IPTV account information, e-mail, personalized Internet services, or other online services via the public network 212. In addition, the second APP switch 240 can be coupled to a subscriber and system store 248 that includes account information, such as account information that is associated with users who access the IPTV system 200 via the private network 210 or the public network 212. In an illustrative embodiment, the subscriber and system store 248 can store subscriber or customer data and create subscriber or customer profiles that are associated with IP addresses, stock-keeping unit (SKU) numbers, other identifiers, or any combination thereof, of corresponding set-top box devices 216, 224. In another illustrative embodiment, the subscriber and system store can store data associated with capabilities of set-top box devices associated with particular customers.

In a particular embodiment, the application tier 204 can include a client gateway 250 that communicates data directly to the client-facing tier 202. In this embodiment, the client gateway 250 can be coupled directly to the CFT switch 230. The client gateway 250 can provide user access to the private network 210 and the tiers coupled thereto. In an illustrative embodiment, the set-top box devices 216, 224 can access the IPTV system 200 via the access network 266, using information received from the client gateway 250. User devices can access the client gateway 250 via the access network 266, and the client gateway 250 can allow such devices to access the private network 210 once the devices are authenticated or verified. Similarly, the client gateway 250 can prevent unauthorized devices, such as hacker computers or stolen set-top box devices from accessing the private network 210, by denying access to these devices beyond the access network 266.

For example, when the first representative set-top box device 216 accesses the client-facing tier 202 via the access network 266, the client gateway 250 can verify subscriber information by communicating with the subscriber and system store 248 via the private network 210. Further, the client gateway 250 can verify billing information and status by communicating with the OSS/BSS gateway 244 via the private network 210. In one embodiment, the OSS/BSS gateway 244 can transmit a query via the public network 212 to the OSS/BSS server 264. After the client gateway 250 confirms subscriber and/or billing information, the client gateway 250 can allow the set-top box device 216 to access IPTV content and VOD content at the client-facing tier 202. If the client gateway 250 cannot verify subscriber information for the set-top box device 216, e.g., because it is connected to an unauthorized twisted pair, the client gateway 250 can block transmissions to and from the set-top box device 216 beyond the access network 266.

As indicated in FIG. 2, the acquisition tier 206 includes an acquisition tier (AQT) switch 252 that communicates with the private network 210. The AQT switch 252 can also communicate with the operations and management tier 208 via the public network 212. In a particular embodiment, the AQT switch 252 can be coupled to a live acquisition server 254 that receives or acquires television content, movie content, advertisement content, other video content, or any combination thereof, from a broadcast service 256, such as a satellite acquisition system or satellite head-end office. In a particular embodiment, the live acquisition server 254 can transmit content to the AQT switch 252, and the AQT switch 252 can transmit the content to the CFT switch 230 via the private network 210.

In an illustrative embodiment, content can be transmitted to the D-servers 232, where it can be encoded, formatted, stored, replicated, or otherwise manipulated and prepared for communication from the video server(s) 280 to the set-top box devices 216, 224. The CFT switch 230 can receive content from the video server(s) 280 and communicate the content to the CPE 214, 222 via the access network 266. The set-top box devices 216, 224 can receive the content via the CPE 214, 222, and can transmit the content to the television monitors 218, 226. In an illustrative embodiment, video or audio portions of the content can be streamed to the set-top box devices 216, 224.

Further, the AQT switch 252 can be coupled to a video-on-demand importer server 258 that receives and stores television or movie content received at the acquisition tier 206 and communicates the stored content to the VOD server 236 at the client-facing tier 202 via the private network 210. Additionally, at the acquisition tier 206, the video-on-demand (VOD) importer server 258 can receive content from one or more VOD sources outside the IPTV system 200, such as movie studios and programmers of non-live content. The VOD importer server 258 can transmit the VOD content to the AQT switch 252, and the AQT switch 252, in turn, can communicate the material to the CFT switch 230 via the private network 210. The VOD content can be stored at one or more servers, such as the VOD server 236.

When users issue requests for VOD content via the set-top box devices 216, 224, the requests can be transmitted over the access network 266 to the VOD server 236, via the CFT switch 230. Upon receiving such requests, the VOD server 236 can retrieve the requested VOD content and transmit the content to the set-top box devices 216,124 across the access network 266, via the CFT switch 230. The set-top box devices 216, 224 can transmit the VOD content to the television monitors 218, 226. In an illustrative embodiment, video or audio portions of VOD content can be streamed to the set-top box devices 216, 224.

FIG. 2 further illustrates that the operations and management tier 208 can include an operations and management tier (OMT) switch 260 that conducts communication between the operations and management tier 208 and the public network 212. In the embodiment illustrated by FIG. 2, the OMT switch 260 is coupled to a TV2 server 262. Additionally, the OMT switch 260 can be coupled to an OSS/BSS server 264 and to a simple network management protocol (SNMP) monitor 286 that monitors network devices within or coupled to the IPTV system 200. In a particular embodiment, the OMT switch 260 can communicate with the AQT switch 252 via the public network 212.

In an illustrative embodiment, the live acquisition server 254 can transmit content to the AQT switch 252, and the AQT switch 252, in turn, can transmit the content to the OMT switch 260 via the public network 212. In this embodiment, the OMT switch 260 can transmit the content to the TV2 server 262 for display to users accessing the user interface at the TV2 server 262. For example, a user can access the TV2 server 262 using a personal computer 268 coupled to the public network 212.

In a particular illustrative embodiment, the client-facing tier 202 can provide media content, such as video content, to the set-top box device 216. The media content can include a selectable trigger, which may be provided by the set-top box device 216 to the TV monitor 218 as a popup within the video display. The client-facing tier 202 may receive data related to selection of the selectable trigger. In response to receiving the data, the electronic store server 282 may provide a graphical user interface including an electronic storefront to the set-top box device 216 for display at the TV monitor 218. The electronic storefront can include data related to multiple purchasable assets as well as multiple options for purchasing one or more of the assets.

In another particular illustrative embodiment, the set-top box device 224 receives media content including an embedded trigger. The set-top box device 224 identifies the embedded trigger and provides a popup to the TV monitor 226 that is related to the embedded trigger. The popup can include information related to a particular promotion and an invitation to access an electronic storefront. A user may utilize the remote control device 228 to request the electronic storefront. The set-top box device 224 receives an input from the remote control device 228 and transmits a request to the client-facing tier 202 for the electronic storefront. The request may include an identifier related to the selected media content, an identifier related to the set-top box device 224, an account identifier associated with the set-top box device 224, an identifier associated with the electronic storefront, or any combination thereof. In a particular embodiment, in response to sending the request, the set-top box device 224 receives a graphical user interface that includes an electronic storefront that has multiple purchasable assets and multiple selectable payment options. The set-top box device 224 provides the graphical user interface to the TV monitor 226. In another particular embodiment, the set-top box device 216 can receive data that can be executed by the processor 270 to generate a graphical user interface that includes an electronic storefront that has multiple purchasable assets and multiple selectable payment options. The set-top box device 224 can provide the generated graphical user interface to the TV monitor 226. A user may utilize the remote control device 226 to purchase one or more assets and to select a payment option related to the purchase. The set-top box device 224 sends an asset identifier and purchase information to the E-store server 282 for fulfillment.

Figure 3:
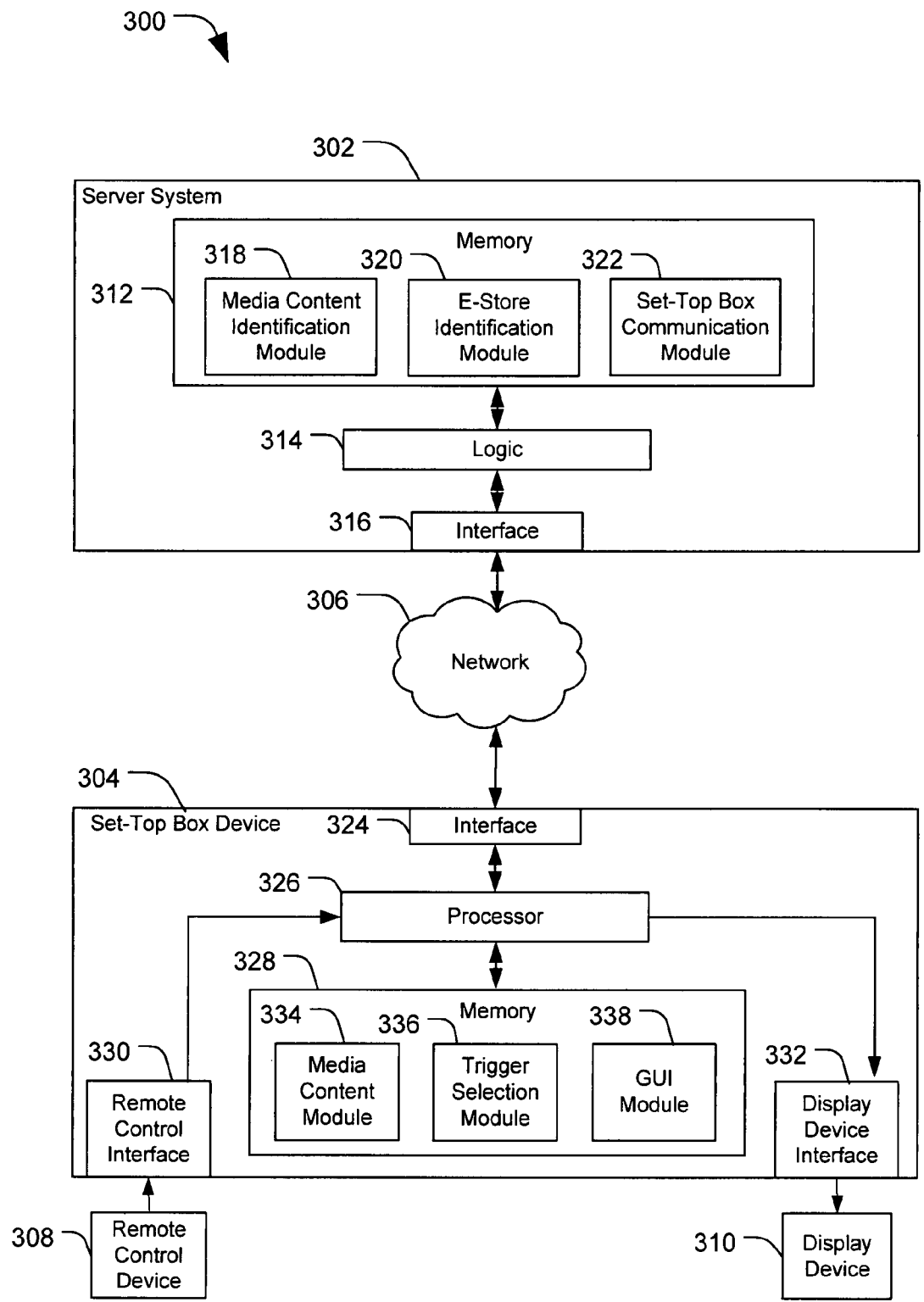
FIG. 3 is a block diagram of a third particular illustrative embodiment of a system to present assets related to media content.

FIG. 3 is a block diagram of a third particular illustrative embodiment of a system 300 to present assets related to media content. The system 300 includes a server system 302 that communicates with a set-top box device 304 via a network 306, which may be the public Internet or a private Internet Protocol Television (IPTV) access network. The server system 302 includes an interface 316 to the network 306, processing logic 314 and memory 312 that is accessible to the processing logic 314.

In a particular embodiment, the memory 312 includes a media content identification module 318 that can be executed by the processing logic 314 to identify media content received at the set-top box device 304. The media content identification module 318 can also be used to transmit media content to the set-top box device 304. The media content can include an embedded selectable trigger, that can be executed at the set-top box device 304 to generate a popup within the video at a display device 310. The memory 312 also includes an electronic store (e-store) identification module 320 that can be executed by the processing logic 314 to identify assets. The e-store identification module 320 can also be executed by the processing logic 314 to generate an electronic storefront, including a graphical user interface presenting the identified assets. The memory 312 also includes a set-top box communication module 322 that can be executed by the processing logic 314 to communicate with the set-top box device 304 to receive requests for an electronic storefront related to media content and to communicate the generated electronic storefront to the set-top box device 304. In a particular illustrative embodiment, the set-top box communication module 322 can also receive data related to purchase orders and payment option selections from the set-top box device 304.

The set-top box device 304 includes an interface 324 to the network 306. The set-top box device 304 also includes a processor 326 coupled to the interface 324 and a memory 328 that is accessible to the processor 326. The set-top box device 324 also includes a remote control interface 330 that communicates with a remote control device 308 and a display device interface 332 that communicates with a display device 310. In a particular embodiment, the memory 328 includes a media content module 334 that is executable by the processor 326 to receive media content from the server system 302 (or from another content source) via the network. The memory 328 includes a trigger selection module 336 that is executable by the processor 326 to identify an embedded selectable trigger within the media content and to generate a selectable popup within the video at the display device based on the embedded trigger. The trigger selection module 336 can also be executed by the processor 326 to receive a selection related to the selectable popup via the remote control device 308 and to communicate data related to the selection to the server system 302 via the network. The memory 328 also includes a graphical user interface (GUI) module 338 that is executable by the processor 326 to receive instructions related to an electronic storefront and to generate a GUI that can be provided to the display device 310 that includes one or more selectable indicators related to purchasable assets.

In a particular illustrative embodiment, the e-store module 320 may be executed to select an electronic storefront from a plurality of stored electronic storefronts based on media content received at the set-top box device 304. In another particular illustrative embodiment, the e-store module 320 can be executed to generate the electronic storefront dynamically, such that the graphical user interface includes an electronic storefront having a first selectable element related to a first asset and a second selectable element related to a second asset (both selected based on the media content). The graphical user interface can also include multiple payment options that are related to a first selectable element and a second selectable element. In a particular illustrative embodiment, the multiple payment options can include an electronic coupon payment option, account billing option to bill a subscriber account associated with the destination device (i.e. the set-top box device), a credit card option, a debit card option, other payment options, or any combination thereof.

In a particular illustrative embodiment, the set-top box device 304 receives media content including an embedded trigger from the server system 302. The set-top box device 304 identifies the embedded trigger and provides the media content and a popup based on the embedded trigger to the display device 310. The set-top box device 304 receives an input from the remote control device 308 that is related to the popup. The set-top box device 304 sends a request to the server system 302 based on the input. The request may include an identifier related to the media content, an identifier associated with the set-top box device 304, a subscriber account identifier, an electronic storefront identifier, other information, or any combination thereof. The set-top box device 304 receives data related to an electronic storefront based on the request, and provides a user interface to the display device 310 that includes the electronic storefront. The electronic storefront includes one or more selectable indicators related to purchasable assets. The electronic storefront also includes one or more payment options for purchasing selected assets. The set-top box device 304 receives a selection of at least one indicator and a selected payment option and sends data related to the selection and the selected payment option to the server system 302 to complete a purchase transaction.

In a particular embodiment, if the purchased asset is an electronic asset, the server system 302 may provide instructions for downloading the asset, may send the purchased asset, may perform other actions, or any combination thereof. If the purchased asset is a tangible object, the server system 302 may transmit a purchase order fulfillment request to a fulfillment center (not shown) to complete the packaging and shipping of the purchased asset. The server system 302 may also notify an inventory system (not shown) to update inventory data based on the purchase.

Figure 4:
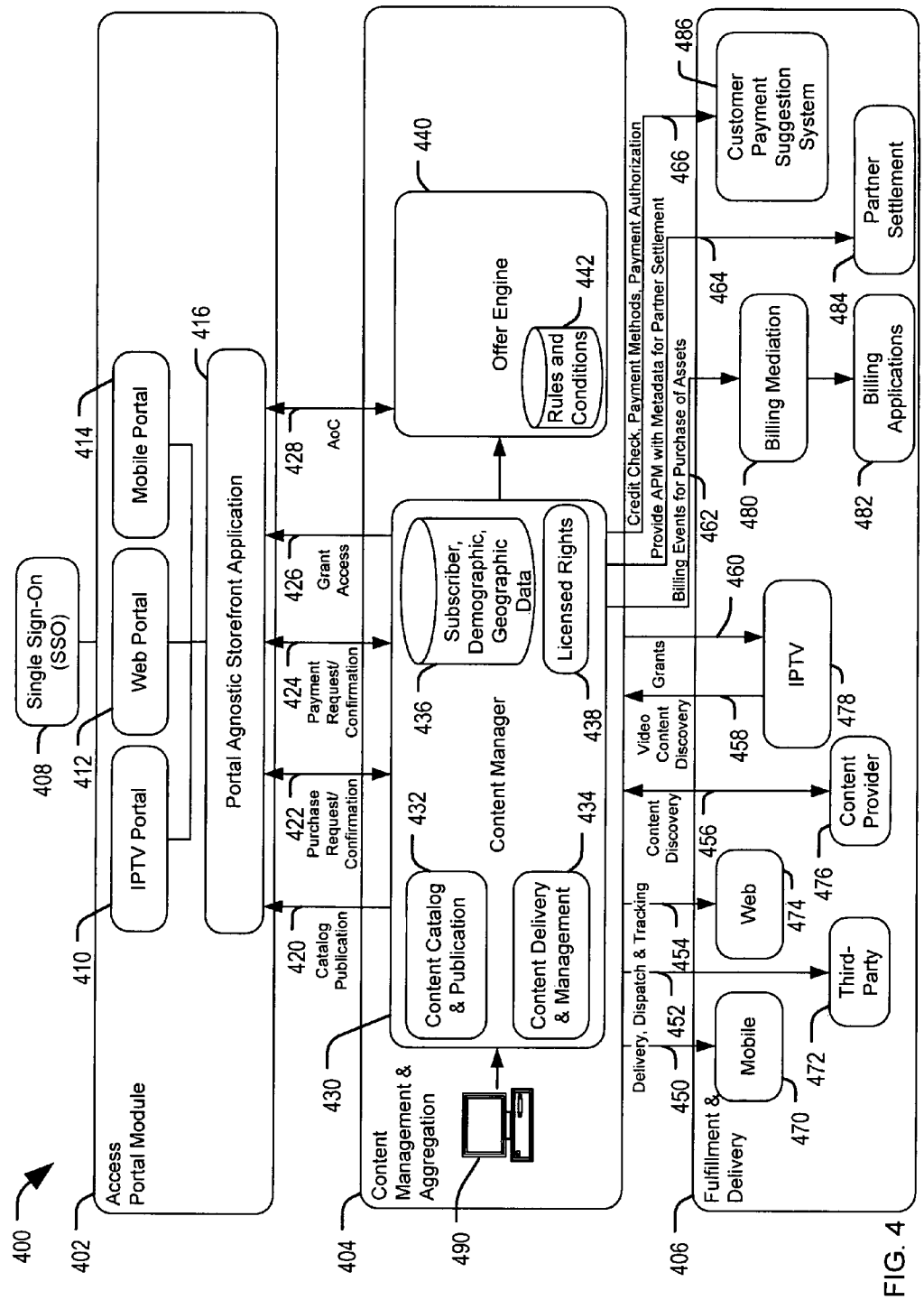
FIG. 4 is a block diagram of a fourth particular illustrative embodiment of a system to present assets related to media content.

FIG. 4 is a block diagram of a fourth particular illustrative embodiment of a system to present assets related to media content, generally designated 400. The system 400 includes a single sign on interface 408 to communicate with one or more of a plurality of access points at an access portal module 402. The access points may include representative access points, such as an Internet Protocol Television (IPTV) portal 410, a web portal 412, and a mobile device portal 414. The access portal module 402 also includes a portal agnostic storefront application 416. The portal agnostic storefront application 416 may send data related to a storefront display via the various access portals 410, 412, 414 to a user device that is signed on via the single sign on interface 408

The system 400 also includes a content management and aggregation module 404 having a content manager 430, an offer engine 440 and an administration device 490. The administration device 490 may communicate with the content management and aggregation module 404, the fulfillment and delivery module 406, and the access portal module 402 to allow administrative configuration of each module. For example, the administrative device 490 may be used to establish offer management rules stored at a rules and conditions database 442. In another example, the administrative device 490 may be used to configure a storefront display provided via the access portal module 402. In another example, the administrative device 490 may be used to configure the fulfillment and delivery module 406.

In a particular embodiment, the content manager 430 includes a content catalog and publication module 432. The content catalog and publication module 432 may identify assets that are available to be offered for sale. For example, the content delivery and management module 434 may query content providers, such as the content provider 476, to identify assets that are available for purchase. The catalog and publication module 432 may process data received from the content providers 476 to identify metadata related to available assets, such as a description of the content of an asset, a format of the asset, a type of the asset, a cost of the asset, other information about the asset, or any combination thereof. The catalog and publication and module 432 may provide a catalog publication output 420 to the portal agnostic storefront application 416 identifying the available assets. The catalog and publication and module 432 may also provide information identifying the available assets to the offer engine 440 to allow offer rules related to the assets to be configured.

In a particular embodiment, the content manager 430 may also include a content delivery and management module 434. The content delivery and management module 434 may manage delivery of purchased assets to user devices. For example, the content delivery and management module 434 may receive payment information for the purchase of an asset via the portal agnostic storefront application 416. The content delivery and management module 434 may send an access grant message to a content provider after payment for an asset has been received and approved. The grant message may authorize the content provider to send the content of the purchased asset to the purchasing user device or another user device.

In a particular embodiment, the content manager 430 may also include a subscriber database 436. The subscriber database 436 may include subscriber data, such as demographic information and geographic information. The subscriber database may be utilized to establish promotional offers, to identify subscribers to which promotional offers should be made, to implement offer rules, and so forth. For example, the offer engine 440 may access the subscriber database 436 in order to determine whether a particular offer applies to a particular subscriber based on the subscriber data.

In a particular embodiment, the content manager 430 may also include a license rights module 438. The license rights module 438 may implement rules to ensure the license rights associated with digital assets are complied with. For example, the license rights module 438 may ensure that royalties associated with digital assets are paid. In another example, the license rights module 438 may determine an amount owed to a content provider or third party resulting from the purchase of a digital asset.

In a particular embodiment, the fulfillment and delivery module 406 may include a variety of fulfillment modules including a mobile module 470, a third party content module 472, a web module 474, a dedicated content provider module 476 and an Internet Protocol Television (IPTV) module 478. The fulfillment modules 470, 472, 474, 476 and 478 provide data identifying assets available for purchase to the content manager 430. In a particular embodiment, the fulfillment modules 470, 472, 474, 476 and 478 may also send data including the content of a purchased asset to a user device.

In a particular embodiment, the fulfillment and delivery module 406 may include one or more transaction application modules, such as a billing mediation module 480, a billing applications module 482, a partner settlement module 484, and customer payment suggestion system 486. The billing mediation module 480 may receive data related to the purchase of assets, e.g., billing events data, from the content manager 430 and may determine a charge for the purchase based on the data. The billing mediation module 480 may pass data related to the purchase to the billing applications module 482. The billing applications module 482 may prepare a bill to charge a subscriber for the purchase of an asset. For example, the billing application module 482 may add the charge to a unified subscriber bill for communication services, such as wireless telephone service, telephone service, television service (e.g., IPTV service), Internet access service, other communication services, or any combination thereof.

In a particular embodiment, the partner settlement module 484 may receive information associated with the purchase of an asset from the content manager 430. The partner settlement module 484 may process the purchase information to determine an amount owed to another party, such as a content provider, license rights holder, fulfillment agent, or other party as a result of the purchase. The partner settlement module 484 may execute payment of the owed amount or pass information related to the owed amount to a payment system.

In a particular embodiment, the customer payment suggestion system 486 may also receive data from the content manager 430 related to purchase an asset. The purchase information may include a purchase price and information about the subscriber. The customer payment suggestion system 486 may determine available payment options for the subscriber, such as a charge to the subscriber's account (e.g., a communication services account), payment by credit card, payment by electronic funds transfer, other payment options, or any combination thereof.

The content management and aggregation module 404 may communicate with the fulfillment and delivery module 406 via a plurality of communication links. Representative examples of the communication links may include delivery, dispatch and tracking communication links 450, 452, 454, content discovery communication link 456, video content discovery link 458, IPTV access grant communication link 460. In addition, the content management and aggregation module 404 may communicate with the transaction application modules of the fulfillment and delivery module 406 via a billing event communication link 462, a partner settlement communication link 464 and credit check and payment authorization communication link 466.

The content manager 430 may communicate with the portal agnostic storefront application 416 via a plurality of communication links 420, 422, 424, 426 and 228. Representative examples of the communication links may include a catalog publication communication link 420 to provide information about available assets, purchase request/confirmation communication link 422 to communicate purchase and purchase confirmation information, a grant access communication link 426 to communicate access grants, and a payment request confirmation communication link 424 to communicate payment request and confirmation information. In addition, the offer engine 440 may communicate with the portal agnostic storefront application 416, for example, via an advice of change (AOC) communication link 428.

During operation of a particular embodiment, the content manager 430 prepares a catalog of assets available for purchase and provides the catalog of assets to the administration device 490 for configuration of offer rules and conditions related to the assets. The offer engine 440 implements the offer rules and conditions to promote the assets in the catalog via a storefront display sent to user devices via the portal agnostic storefront application 416. The content manager 430 receives requests for purchase of such assets via the portal agnostic application 416. The offer engine 440 provides an advice of charge (AoC) to the subscriber associated with the purchase via the portal agnostic storefront application 416. If the subscriber approves the charge, the content manager 430 sends payment information to the transaction application modules 480, 482, 484, 486 and communicates with the fulfillment and delivery module 406 in order to fulfill the purchase.

In a particular embodiment, after purchase of the asset, the portal agnostic storefront application 416 may provide the content of the electronic asset via a suitable interface based on the asset type. For example, IPTV related asset may be provided via the IPTV portal 410, an Internet asset may be available via the web portal 412, and a mobile asset may be available via the mobile portal 414. Additionally, the content manager 430 may interact with the fulfillment and delivery module 406 to provide billing information necessary to billing the subscriber for the asset purchase and to pay content providers or others third parties for the transaction.

Figure 5:
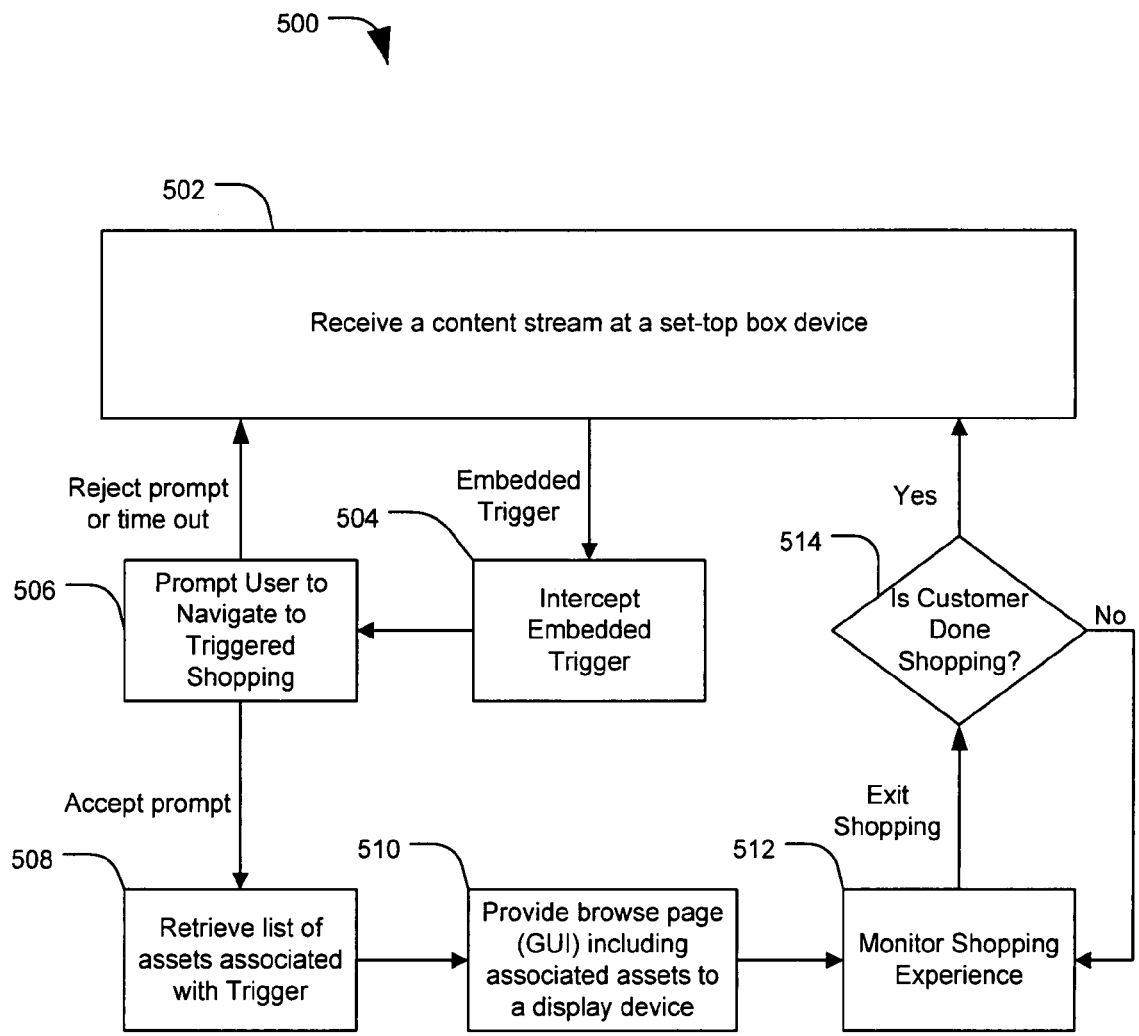
FIG. 5 is a flow diagram of a particular illustrative embodiment of a method of presenting assets related to media content.

FIG. 5 is a flow diagram of a particular illustrative embodiment of a method 500 of presenting assets related to media content. At 502, a content stream is received at a set-top box device. Moving to 504, the set-top box device intercepts an embedded trigger. Advancing to 506, the set-top box device prompts a user to navigate to an electronic storefront (triggered shopping). If the user does not respond (time out) or if the user rejects the prompt, the method returns to 502. If the user accepts the prompt, the method proceeds to 508 and the set-top box device retrieves a list of assets associated with the trigger. Advancing to 510, the set-top box device provides a browse page (GUI) including the associated assets to a display device. Proceeding to 512, the set-top box device monitors the shopping experience. At Moving to 514, the set-top box device determines if the customer is done shopping. If not, the method returns to 512 and the set-top box device continues to monitor the shopping experience. Returning to 514, if the customer is done shopping, the method advances to 502.

Figure 6:
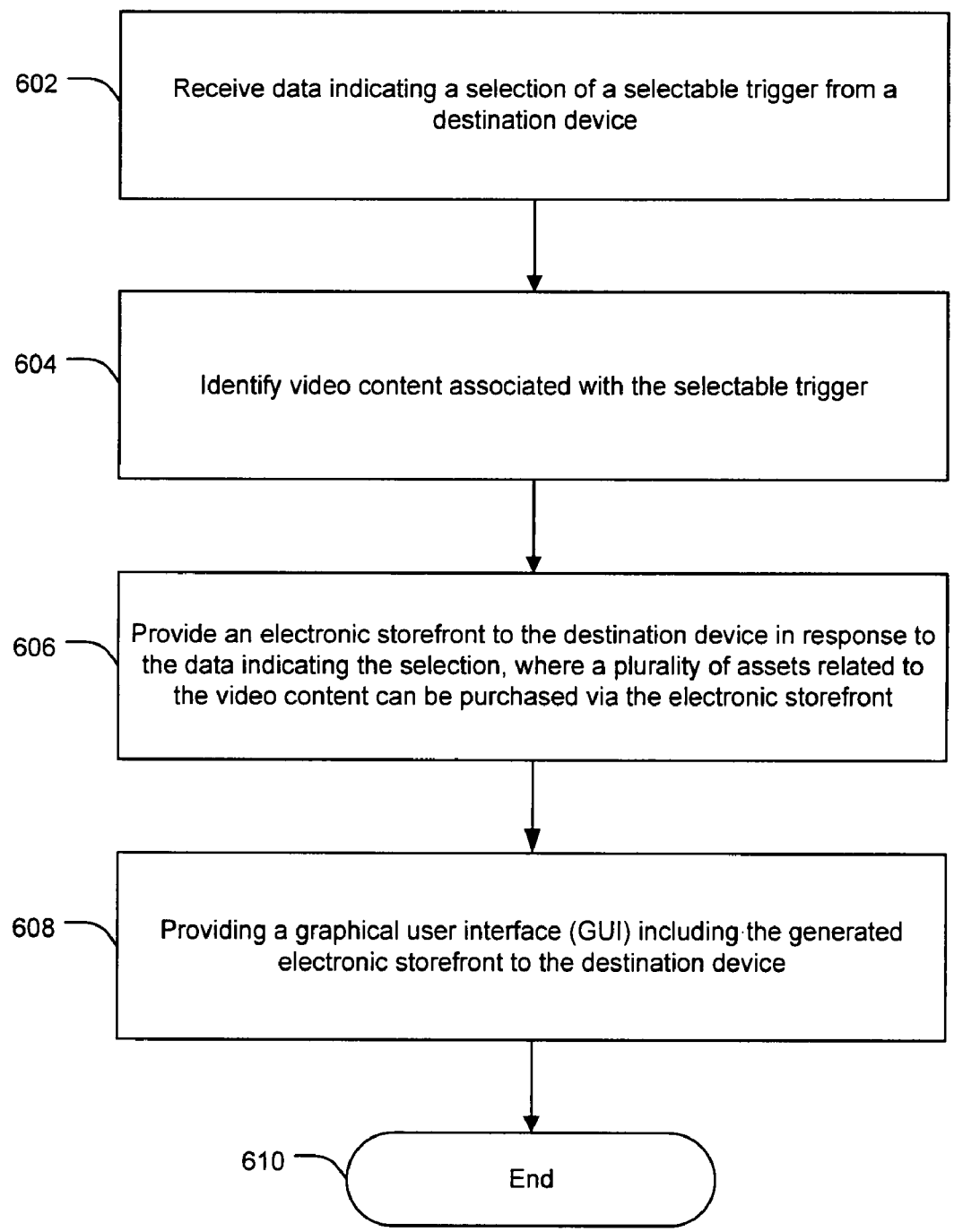
FIG. 6 is a flow diagram of a second particular illustrative embodiment of a method of presenting assets related to media content.

FIG. 6 is a flow diagram of a particular illustrative embodiment of a method of presenting assets related to media content. At 602, a server system receives data indicating a selection of a selectable trigger from a destination device. In a particular embodiment, the selectable trigger can be specific to selected media content. In another particular embodiment, the selectable trigger can be related to a particular promotion, a particular storefront, another feature, or any combination thereof. Moving to 604, the server system identifies video content associated with the selectable trigger. Advancing to 606, the server system provides an electronic storefront in response to the data indicating the selection, where a plurality of assets can be purchased via the electronic storefront. Continuing to 608, the server system provides a graphical user interface (GUI) including the generated electronic storefront to the destination device. The method terminates at 610.

In a particular illustrative embodiment, the server system may provide instructions that can be executed at the destination device, using an Internet browser application, a graphical user interface (GUI) generator module, or an other application to render a graphical user interface. Additionally, the graphical user interface can include multiple payment options associated with each of the selectable indicators.

Figure 7:
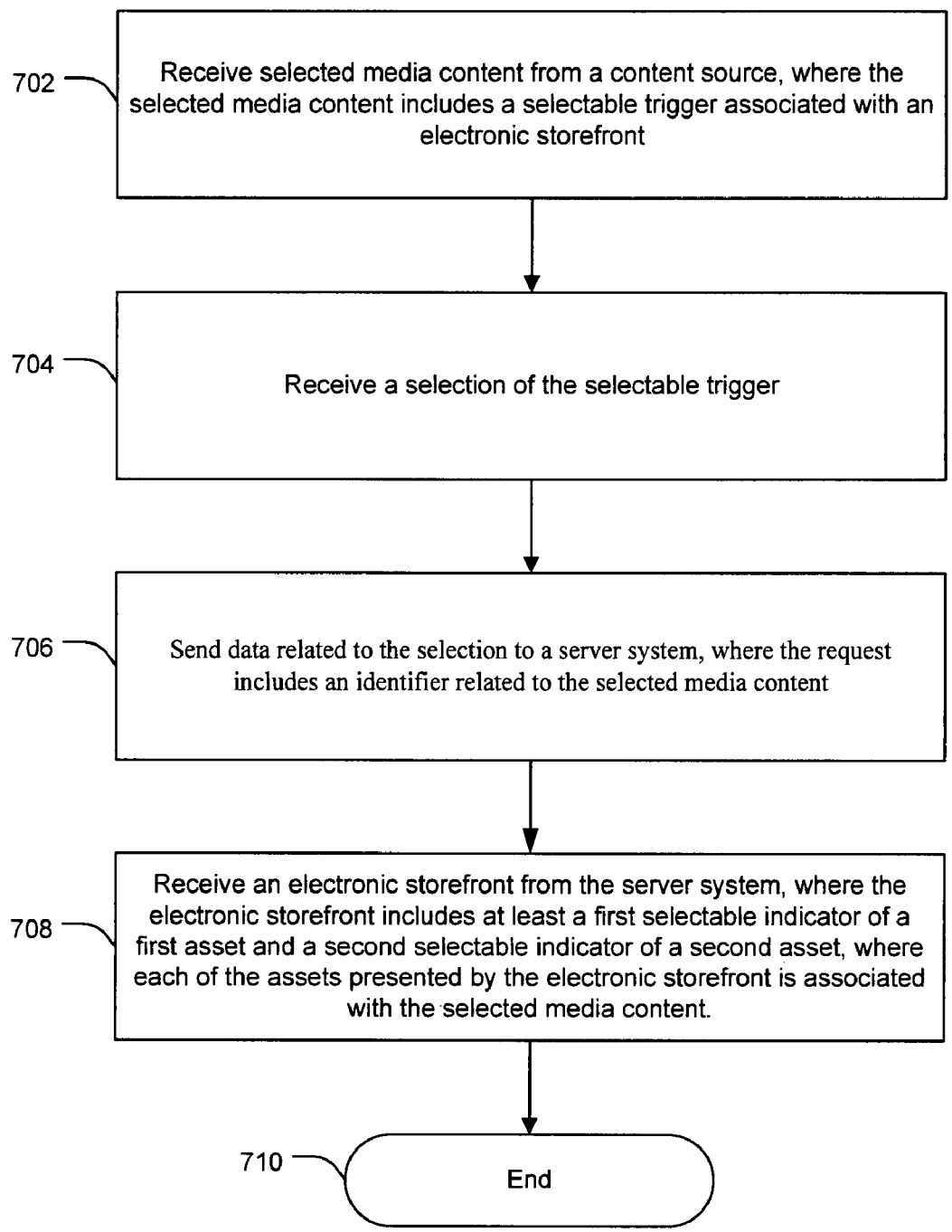
FIG. 7 is a block diagram of a third particular illustrative embodiment of a method of presenting assets related to media content.

FIG. 7 is a flow diagram of a second particular illustrative embodiment of a method of presenting assets related to media content. At 702, a set-top box device receives selected media content from a server system, where the selected media content includes a selectable trigger associated with an electronic storefront. Advancing to 704, the set-top box device receives a selection of the selectable trigger within selected media content. Advancing to 704, the set-top box device receives a selection of the selectable trigger, for example, from a remote control device. Proceeding to 706, the set-top box device sends data related to the selection to a server system, where the request includes an identifier related to the selected media content. Continuing to 708, the set-top box device receives an electronic storefront from the server system, where the electronic storefront includes at least a first selectable indicator of a first asset and a second selectable indicator of a second asset. Each of the assets presented by the electronic storefront is associated with the selected media content.

Figure 8:
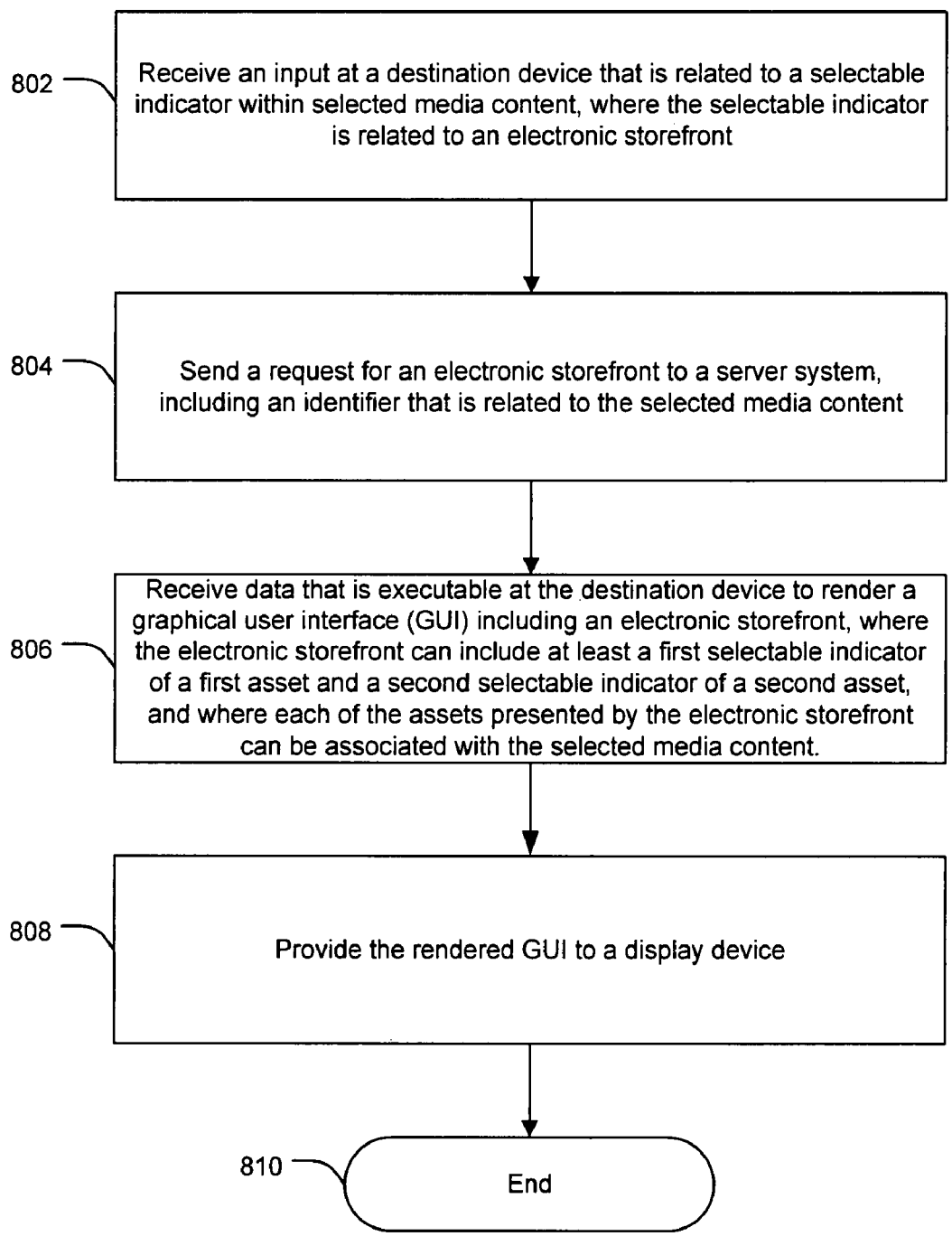
FIG. 8 is a block diagram of a fourth particular illustrative embodiment of a method of presenting assets related to media content.

FIG. 8 is a block diagram of a fourth particular illustrative embodiment of a method of presenting assets related to media content. At 802, a destination device, such as a set-top box device, receives an input that is related to a selectable indicator within selected media content, where the selectable indicator is related to an electronic storefront. Moving to 804, the destination device sends a request for an electronic storefront to a server system. The request can include an identifier related to the selected media content. Proceeding to 806, the destination device receives data that is executable at the destination device to render a graphical user interface (GUI) including an electronic storefront. The electronic storefront can include at least a first selectable indicator of a first asset and a second selectable indicator of a second asset. Each of the assets presented by the electronic storefront can be associated with the selected media content. Continuing to 808, the destination device may provide the rendered GUI to a display device. The method terminates at 810.

In a particular illustrative embodiment, the electronic storefront can include multiple purchasable assets. The multiple purchasable assets can include physical assets, such as an article of clothing (e.g., a shirt, a baseball hat, other clothing, or any combination thereof), a coffee mug, a glass, collectibles (such as figurines), another physical item, or any combination thereof. Additionally, the multiple purchasable assets can include electronic assets, such as a soundtrack download, a ring tone download, a computer desktop wallpaper download, other digital images, other electronic products, or any combination thereof. In another particular embodiment, the multiple purchase options can include an electronic asset to alter a subscription service, to subscribe to additional services, to interact with other services, or any combination thereof.

FIG. 9-13 include ladder diagrams that illustrate examples of interactions between various modules to implement particular embodiments of a method of presenting assets related to media content. In particular, the ladder diagrams illustrate interactions between a user device 902, a marketing module 904, a storefront module 906, a content manager 908, an offer engine 910, an operation systems and support (OSS) billing systems and support (BSS) gateway 912, an Internet Protocol Television (IPTV) system 914, a mobile module 916, and a billing module 918.

Figure 9:
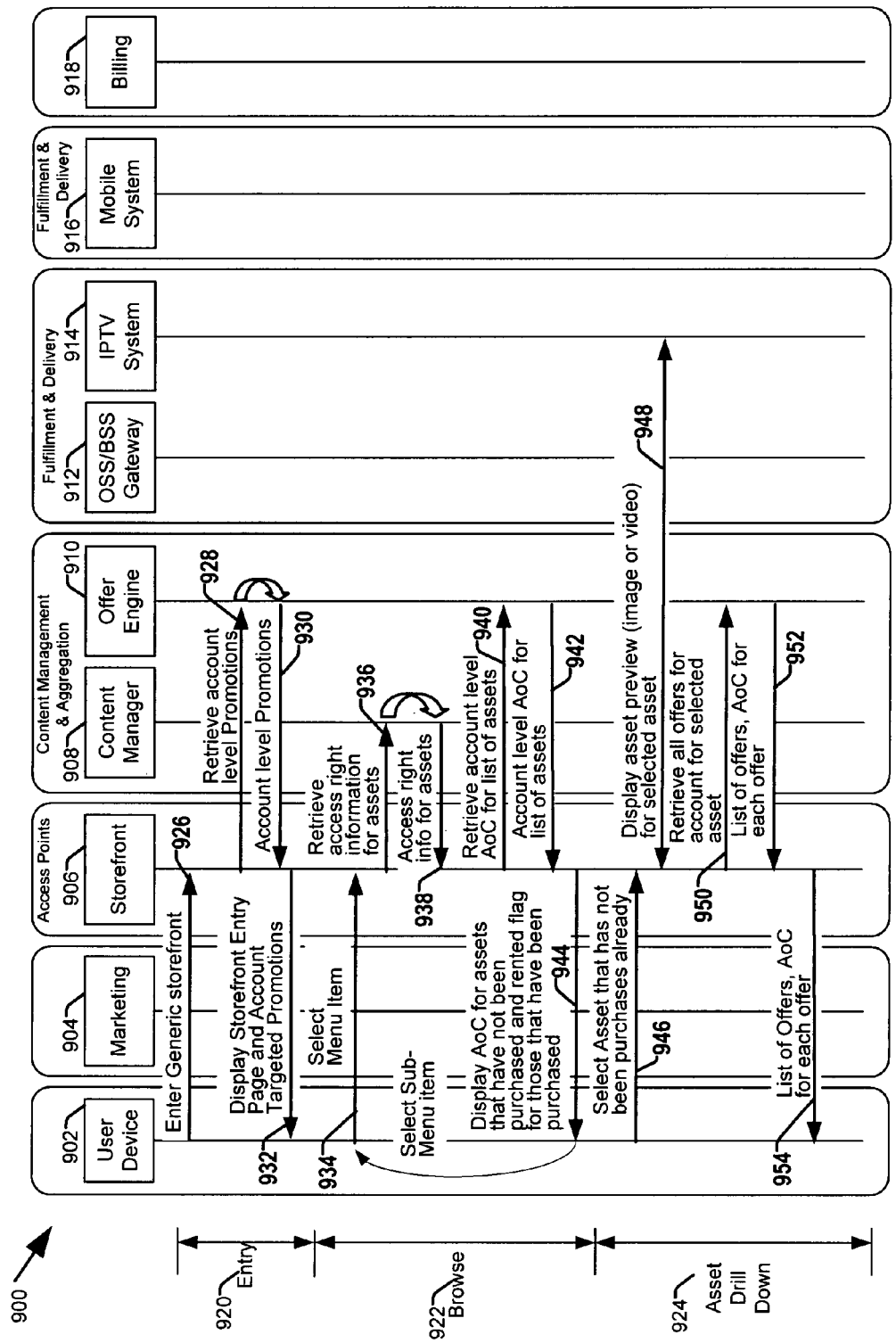
FIG. 9 is a ladder diagram of a fifth particular illustrative embodiment of a method of presenting assets related to media content.

Referring to FIG. 9, a ladder diagram of a first particular embodiment of a method of promoting electronic assets is shown and is generally designated 900. The method 900 includes various stages including an entry stage 920, a browse stage 922, and an asset drill down stage 924.

In connection with the entry stage 920, a message 926 may be sent from the user device 902 to the storefront module 906. The message 926 may include a request to enter the storefront, e.g., to access data related to a storefront display. The storefront module 906 may include a portal agnostic application adapted to communicate with a variety of user devices, such as the user device 902. The storefront module 906 sends a message 928 to the offer engine 910 to request account level promotions. In an illustrative embodiment, account level promotions may include promotions offered to a particular user based on subscriber data associated with the user. For example, an account level promotion may be offered to a user based on the user's purchase history, location or other subscriber data. The offer engine 910 responds to the storefront module 906 with a message 930 that includes account level promotions information. The storefront module 906 sends a message 932 to the user device 902 including the storefront data and the account level promotions.

In connection with the browse stage 922, the user device 902 may display a user interface based on the storefront data and the account level promotions. In an illustrative embodiment, the user interface may include one or more selectable menus associated with particular assets. If the user selects a menu, the user device 902 may send a message 934 indicating the selection to the storefront module 906. The storefront module 906 may send a message 936 to the content manager 908 to retrieve access right information regarding the selection. The content manager 908 may respond with a message 938 including the access right information. In a particular embodiment, a user may have access rights to an asset indicating whether the asset has been purchased, is available for purchase, or has already been viewed.

The storefront module 906 may also send a message 940 to the offer engine 910 to retrieve advice of charge (AoC) information (e.g., purchase price information) related to assets associated with the menu. In a particular illustrative embodiment, the offer engine 910 may send a message to the content manager 908 requesting dynamic condition information, and the content manager 908 may respond with a message including the dynamic condition information.

The offer engine 910 may determine the advice of charge for the account of each asset identified by storefront module 906 based on such dynamic condition information or may determine the advice of charge based on the message 940. If no offers apply to a particular asset, the offer engine 910 may not return anything for the particular asset. If multiple offers apply to a particular asset, the offer engine 910 may return one AoC, but may also indicate that other offers also apply. In a particular embodiment, if multiple offers apply to a particular asset, the offer engine 910 may return the AoC having the lowest price. The offer engine 910 may send a message 942 back to the storefront module 906 with the account level AoC for the list of assets. The storefront module 906 may send a message 944 to the user device 902 including a list of assets that are available for purchase and an AoC related to each available asset. In a particular embodiment, the storefront module 906 may only list an advice of charge for assets that are available for purchase. The message 944 from the storefront module 906 may also include information identifying assets that have already been purchased.

In connection with the asset drill down stage 924, a user may select an asset that has not already been purchased, and the user device 902 may send a message 946 indicating the selection to the storefront module 906. The storefront module 906 may access a preview of the selected asset from a fulfillment and delivery module. For example, for a video on demand asset, the storefront module 906 may access the preview from the IPTV system 914 via a message 948. The storefront module 906 may also send a message 950 to the offer engine 910 to retrieve offers related to the selected asset. The offer engine 910 may determine the dynamic condition from the content manager 908 via messages (not shown). The offer engine 910 may provide a list of offers relate to the asset and AoC for each offer to the storefront module 906 via a message 952. The storefront module 906 may provide the list of offers related to the asset and the AoC for each such asset to the user device 902 via a message 954. If, after the asset drill down stage 930, the user continues with the purchase of the selected asset, the method 900 may proceed to FIG. 10.

Figure 10:
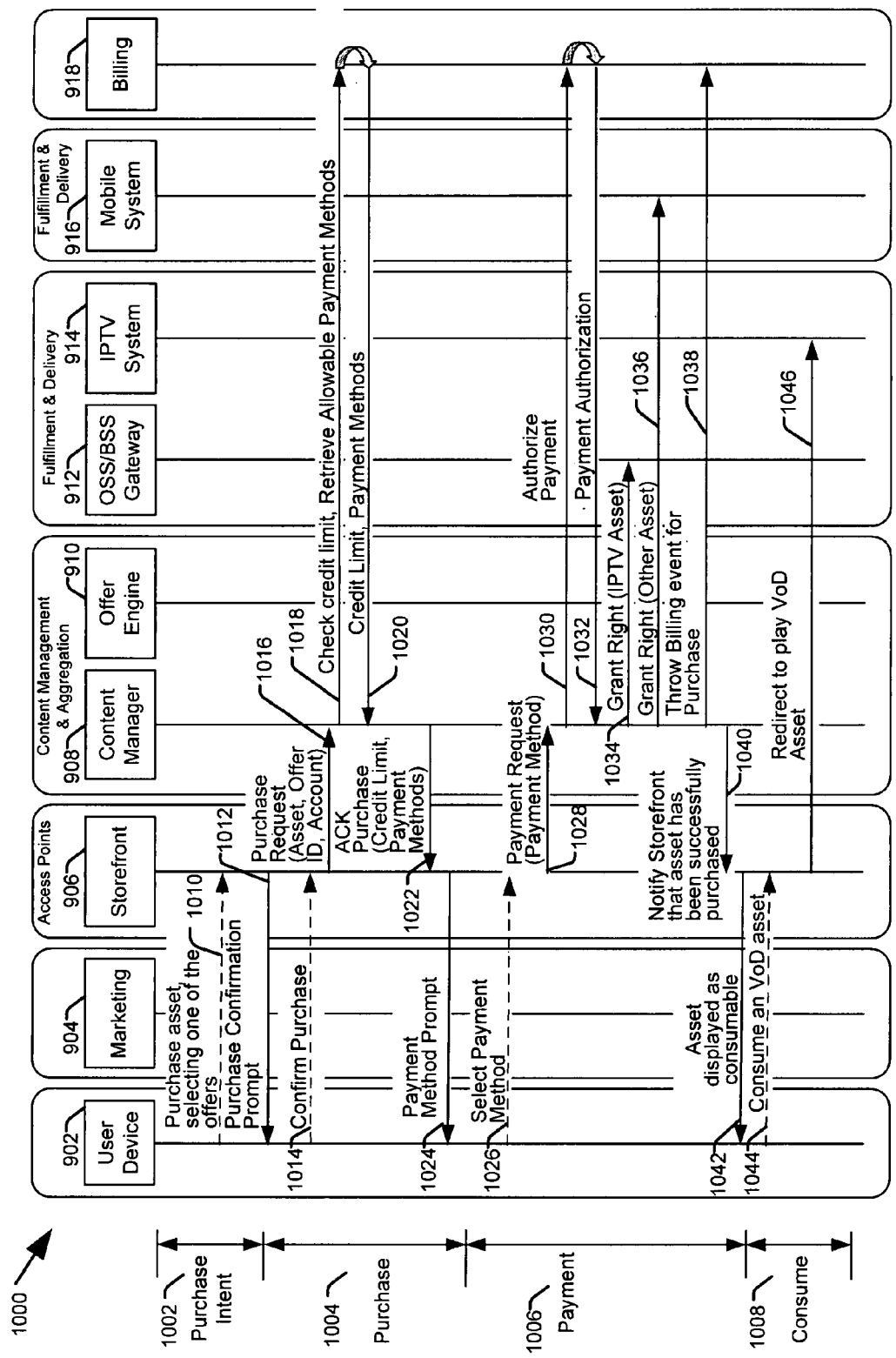
FIG. 10 is a ladder diagram of a sixth particular illustrative embodiment of a method of presenting assets related to media content.

FIG. 10 is a ladder diagram of a fourth particular illustrative embodiment of a method of presenting assets related to media content that is generally designated 1000. The method 1000 includes various stages including a purchase intent stage 1002, a purchase stage 1004, a payment stage 1006, and a consume stage 1008.

In connection with the purchase intent stage 1002, a user can interact with a selectable indicator to select one of the offers via a graphical user interface at the user device 902. The user device 902 may send a message 1010 to the storefront 906 to purchase the selected asset. In response to receiving the message 1010, the storefront 906 can send a message 1012 to provide a purchase confirmation prompt to the user device 902.

In connection with the purchase stage 1004, the user device 902 may receive the purchase confirmation prompt 1002 and provide the prompt to the user device 902. A user may confirm the purchase by interacting with a graphical user interface at the user device 902, and the user device can send a confirm purchase message 1014 to the storefront 906. The storefront 906 may send a message 1016 to a content manager 908 that includes a purchase request, including asset information, offer identification information, and account information. The content manager 908 can send a message 1018 to a billing system 918 to check a credit limit associated with the account and to request allowable payment methods. The billing system 918 receives the message 1018 and sends a message 1020 to the content manager 908 that includes the credit limit information and one or more payment methods. The content manager 908 sends a message 1022 that acknowledges the purchase and provides the credit limit and available credit methods to the storefront 906. The storefront 906 sends a payment method prompt message 1024 to the user device 902.

In connection with the payment stage 1006, the user may interact with a graphical user interface at the user device 902 to select a payment method related to the payment method prompt. The user device 902 sends a message 1026 to the storefront 906 that includes a selected payment method. The storefront 906 communicates a message 1028 to the content manager 908 that includes a payment request and an associated payment method. The content manager 908 sends an authorize payment message 1030 to the billing system 918, which returns a payment authorization message 1032 to the content manager 908. The content manager 908 can send a message 1034 to an Operations and Systems Support (OSS)/Billing Systems and Support (BSS) gateway 912 to grant rights to an Internet Protocol Television (IPTV) asset. The content manager 908 may also send a message 1036 to the mobile system 916 to grant rights to other assets. The content manager 908 can also send a message 1038 to the billing system 918 to throw a billing event for the asset purchase. The content manager 908 also sends a message 1040 to the storefront 906 to notify the storefront 906 that an asset has been successfully purchased.

In connection with the consume stage 1008, the storefront 906 sends a message 1042 to the user device 902 to display an asset as consumable. The user may interact with a user interface at the user device 902 to select the consumable asset. The user device 902 can send a message 1044 to the storefront 906 to consume a video on demand (VOD) asset. The storefront 906 can send a message 1046 to the IPTV system 914 to redirect the VOD consume asset message 1044.

Figure 11:
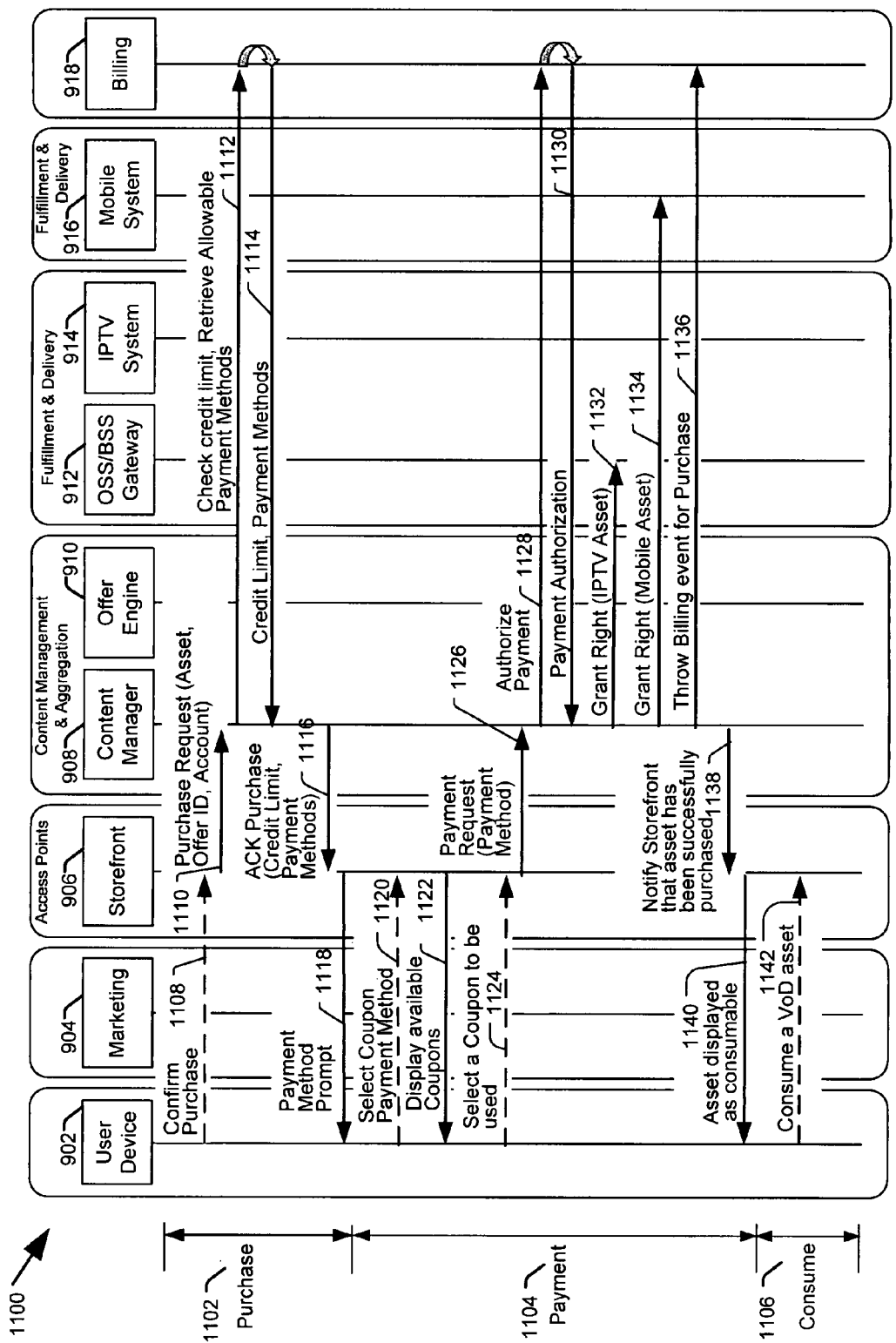
FIG. 11 is a ladder diagram of a seventh particular illustrative embodiment of a method of presenting assets related to media content.

FIG. 11 is a ladder diagram of a fifth particular illustrative embodiment of a method of presenting assets related to media content that is generally designated 1100. The method 1100 includes various stages including a purchase stage 1102, a payment stage 1104, and a consume stage 1106.

In connection with the purchase stage 1102, a user may confirm the purchase by interacting with a graphical user interface at the user device 902, and the user device can send a confirm purchase message 1108 to the storefront 906. The storefront 906 may send a message 1110 to a content manager 908 that includes a purchase request, including asset information, offer identification information, and account information. The content manager 908 can send a message 1112 to a billing system 918 to check a credit limit associated with the account and to request allowable payment methods. The billing system 918 receives the message 1112 and sends a message 1114 to the content manager 908 that includes the credit limit information and one or more payment methods. The content manager 908 sends a message 1116 that acknowledges the purchase and provides the credit limit and available credit methods to the storefront 906. The storefront 906 sends a payment method prompt message 1118 to the user device 902.

In connection with the payment stage 1104, the user may interact with a graphical user interface at the user device 902 to select a coupon payment method related to the payment method prompt. The user device 902 sends a message 1120 to the storefront 906 that includes a selected coupon payment method. The storefront 906 communicates a message 1122 to the user device 902 to prompt a user to select a coupon to be used. The user can interact with a user interface to select a coupon, and the user device 902 sends a message 1124 to the storefront 906 that includes the selection. The storefront 906 can send a message 1126 to the content manager 908 that includes a payment request and an associated payment method. The content manager 908 sends an authorize payment message 1128 to the billing system 918, which returns a payment authorization message 1130 to the content manager 908. The content manager 908 can send a message 1132 to an Operations and Systems Support (OSS)/Billing Systems and Support (BSS) gateway 912 to grant rights to an Internet Protocol Television (IPTV) asset. The content manager 908 may also send a message 1134 to the mobile system 916 to grant rights to other assets. The content manager 908 can also send a message 1136 to the billing system 918 to throw a billing event for the asset purchase. The content manager 908 also sends a message 1138 to the storefront 906 to notify the storefront 906 that an asset has been successfully purchased.

In connection with the consume stage 1106, the storefront 906 sends a message 1140 to the user device 902 to display an asset as consumable. The user may interact with a user interface at the user device 902 to select the consumable asset. The user device 902 can send a message 1142 to the storefront 906 to consume a video on demand (VOD) asset.

Figure 12:
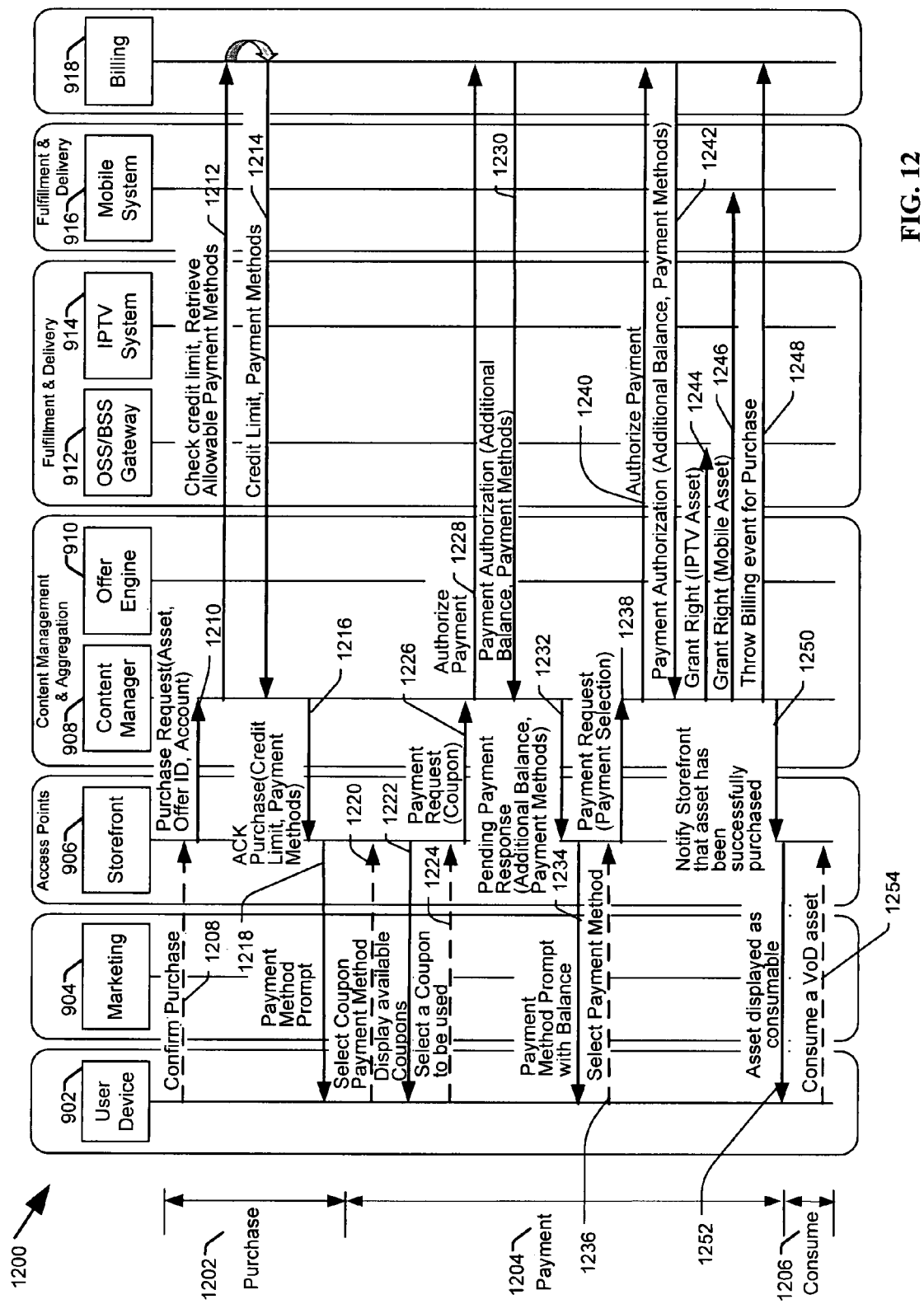
FIG. 12 is a ladder diagram of a eighth particular illustrative embodiment of a method of presenting assets related to media content.

FIG. 12 is a ladder diagram of a sixth particular illustrative embodiment of a method of presenting assets related to media content that is generally designated 1200. The method 1200 includes various stages including a purchase stage 1202, a payment stage 1204, and a consume stage 1206.

In connection with the purchase stage 1202, a user may confirm the purchase by interacting with a graphical user interface at the user device 902, and the user device can send a confirm purchase message 1208 to the storefront 906. The storefront 906 may send a message 1210 to a content manager 908 that includes a purchase request, including asset information, offer identification information, and account information. The content manager 908 can send a message 1212 to a billing system 918 to check a credit limit associated with the account and to request allowable payment methods. The billing system 918 receives the message 1212 and sends a message 1214 to the content manager 908 that includes the credit limit information and one or more payment methods. The content manager 908 sends a message 1216 that acknowledges the purchase and provides the credit limit and available credit methods to the storefront 906. The storefront 906 sends a payment method prompt message 1218 to the user device 902.

In connection with the payment stage 1204, the user may interact with a graphical user interface at the user device 902 to select a coupon payment method related to the payment method prompt. The user device 902 sends a message 1220 to the storefront 906 that includes a selected coupon payment method. The storefront 906 communicates a message 1222 to the user device 902 to prompt a user to select a coupon to be used. The user can interact with a user interface to select a coupon, and the user device 902 sends a message 1224 to the storefront 906 that includes the selection. The storefront 906 can send a message 1226 to the content manager 908 that includes a payment request and an associated payment method. The content manager 908 sends an authorize payment message 1228 to the billing system 918, which returns a payment authorization message 1230 to the content manager 908. The content manager 908 sends a message 1232 to the storefront 906 that includes a pending payment response (additional balance information and payment options). The storefront 906 sends a message 1234 to the user device 902 that includes a payment method prompt with balance information. The user can interact with a user interface at the user device 902 to select a payment method, and the user device can send a message 1236 including the selected payment method to the storefront. The storefront can send a message 1240 sends an authorize payment message 1240 to the billing system 918, which returns a payment authorization message 1242 to the content manager 908. The content manager 908 can send a message 1244 to an Operations and Systems Support (OSS)/Billing Systems and Support (BSS) gateway 912 to grant rights to an Internet Protocol Television (IPTV) asset. The content manager 908 may also send a message 1246 to the mobile system 916 to grant rights to other assets. The content manager 908 can also send a message 1248 to the billing system 918 to throw a billing event for the asset purchase. The content manager 908 also sends a message 1250 to the storefront 906 to notify the storefront 906 that an asset has been successfully purchased.

In connection with the consume stage 1206, the storefront 906 sends a message 1252 to the user device 902 to display an asset as consumable. The user may interact with a user interface at the user device 902 to select the consumable asset. The user device 902 can send a message 1254 to the storefront 906 to consume a video on demand (VOD) asset.

Figure 13:
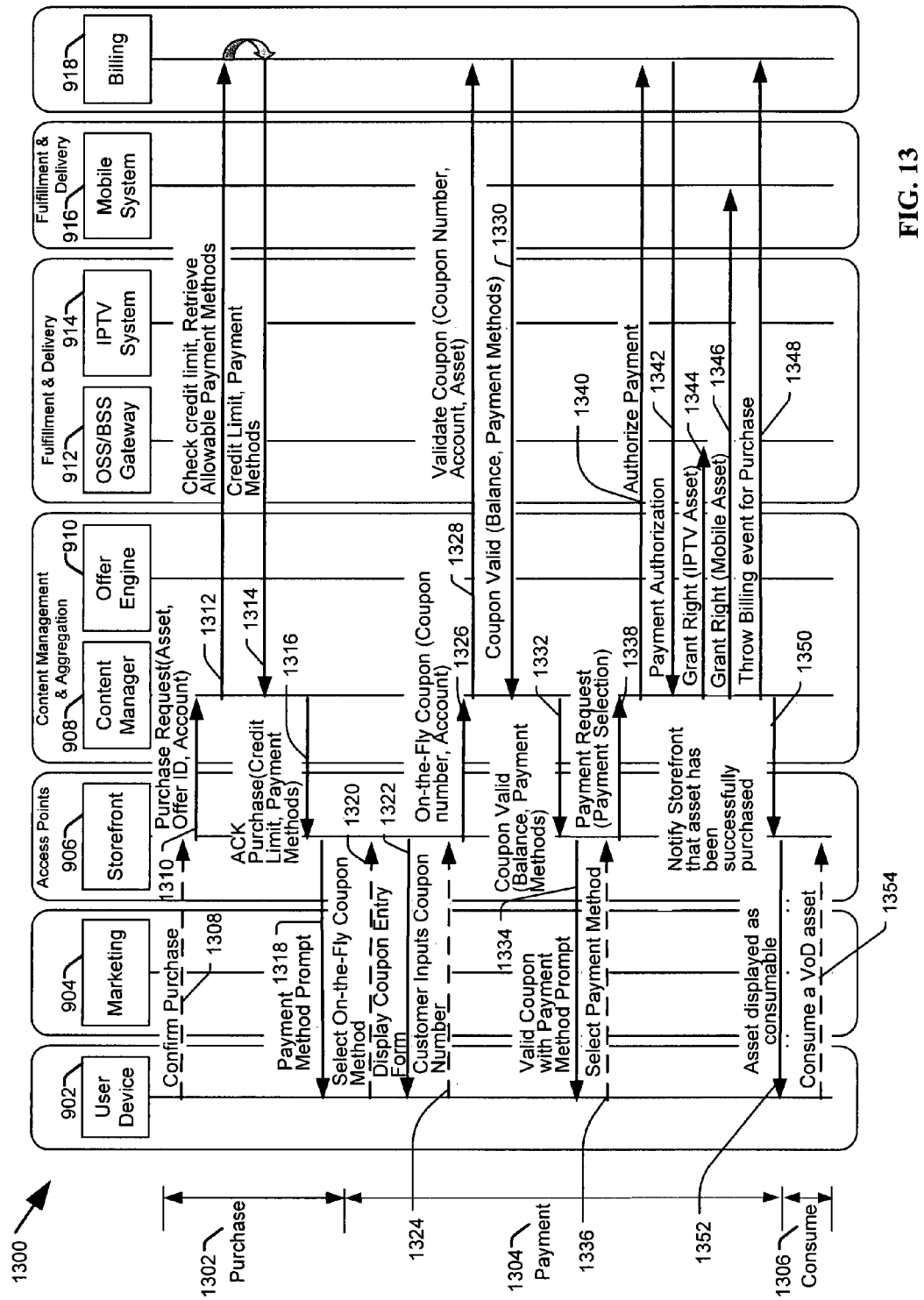
FIG. 13 is a ladder diagram of a ninth particular illustrative embodiment of a method of presenting assets related to media content.

FIG. 13 is a ladder diagram of a seventh particular illustrative embodiment of a method of presenting assets related to media content that is generally designated 1300. The method 1300 includes various stages including a purchase stage 1302, a payment stage 1304, and a consume stage 1306.

In connection with the purchase stage 1302, a user may confirm the purchase by interacting with a graphical user interface at the user device 902, and the user device can send a confirm purchase message 1308 to the storefront 906. The storefront 906 may send a message 1310 to a content manager 908 that includes a purchase request, including asset information, offer identification information, and account information. The content manager 908 can send a message 1312 to a billing system 918 to check a credit limit associated with the account and to request allowable payment methods. The billing system 918 receives the message 1312 and sends a message 1314 to the content manager 908 that includes the credit limit information and one or more payment methods. The content manager 908 sends a message 1316 that acknowledges the purchase and provides the credit limit and available credit methods to the storefront 906. The storefront 906 sends a payment method prompt message 1318 to the user device 902.

In connection with the payment stage 1304, the user may interact with a graphical user interface at the user device 902 to select an "on the fly" coupon payment method related to the payment method prompt. The user device 902 sends a message 1320 to the storefront 906 that includes a selected "on the fly" coupon payment method. The storefront 906 communicates a message 1322 to the user device 902 that includes a display coupon entry form. The user can interact with a user interface to interact with the entry form, and the user device 902 sends a message 1324 to the storefront 906 that includes a coupon number. The storefront 906 can send a message 1326 to the content manager 908 that includes the "on the fly" coupon, including a coupon number and an account identifier. The content manager 908 sends a validate coupon message 1328 to the billing system 918, including the coupon number, the account number, and asset information). The billing system 918 sends a payment authorization message 1230 to the content manager 908 that includes coupon valid information, balance information, and payment information. The content manager 908 sends a message 1332 to the storefront 906 that includes a coupon valid message together with balance and payment method information. The storefront 906 sends a message 1334 to the user device 902 that includes the valid coupon and a payment method prompt with balance information. The user can interact with a user interface at the user device 902 to select a payment method, and the user device can send a message 1336 including the selected payment method to the storefront. The storefront can send a message 1340 sends an authorize payment message 1340 to the billing system 918, which returns a payment authorization message 1342 to the content manager 908. The content manager 908 can send a message 1344 to an Operations and Systems Support (OSS)/Billing Systems and Support (BSS) gateway 912 to grant rights to an Internet Protocol Television (IPTV) asset. The content manager 908 may also send a message 1346 to the mobile system 916 to grant rights to other assets. The content manager 908 can also send a message 1348 to the billing system 918 to throw a billing event for the asset purchase. The content manager 908 also sends a message 1350 to the storefront 906 to notify the storefront 906 that an asset has been successfully purchased.

In connection with the consume stage 1306, the storefront 906 sends a message 1352 to the user device 902 to display an asset as consumable. The user may interact with a user interface at the user device 902 to select the consumable asset. The user device 902 can send a message 1354 to the storefront 906 to consume a video on demand (VOD) asset.

Figure 14:
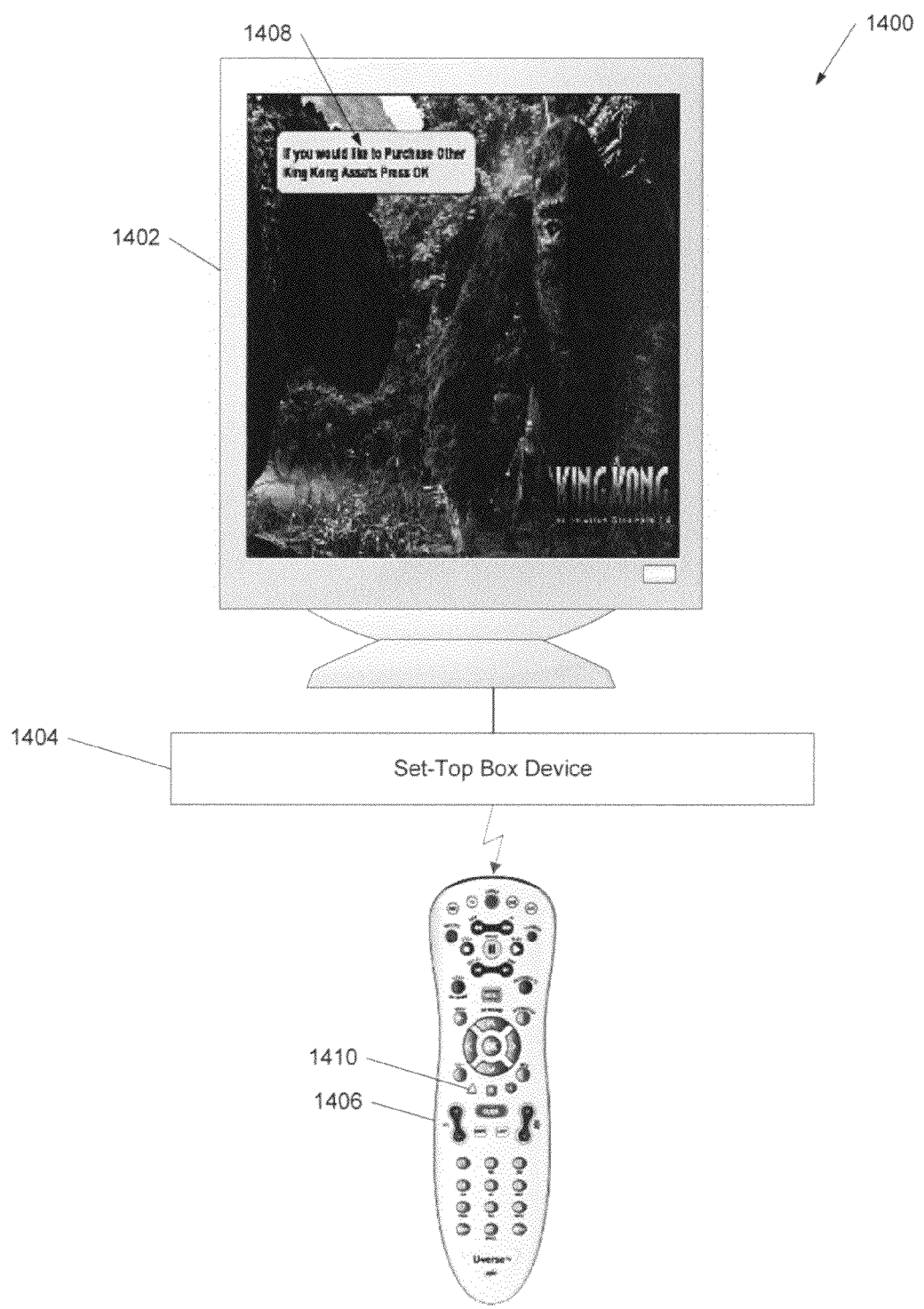
FIG. 14 is a block diagram of a system to present assets related to media content.

FIG. 14 is a block diagram of a system 1400 to present assets related to media content. The system 1400 includes a set-top box device 1404 that can communicate with a display device 1402. The set-top box device 1404 can also receive inputs from a remote control device 1406. The set-top box device 1404 may provide media content, such as the movie King Kong to the display device 1402. A selectable trigger may be embedded within the media content, and the set-top box device 1404 may capture the selectable trigger and provide a popup 1408 to the display device for display within video of the media content. The popup 1408 may provide a display representative of a selectable option. A user may access the selectable option by selecting a key, such as the key 1410 on the remote control device 1406. The set-top box device 1404 may send data related to the selection (i.e. a request) to a server system to retrieve an electronic storefront associated with the media content.

Figure 15:
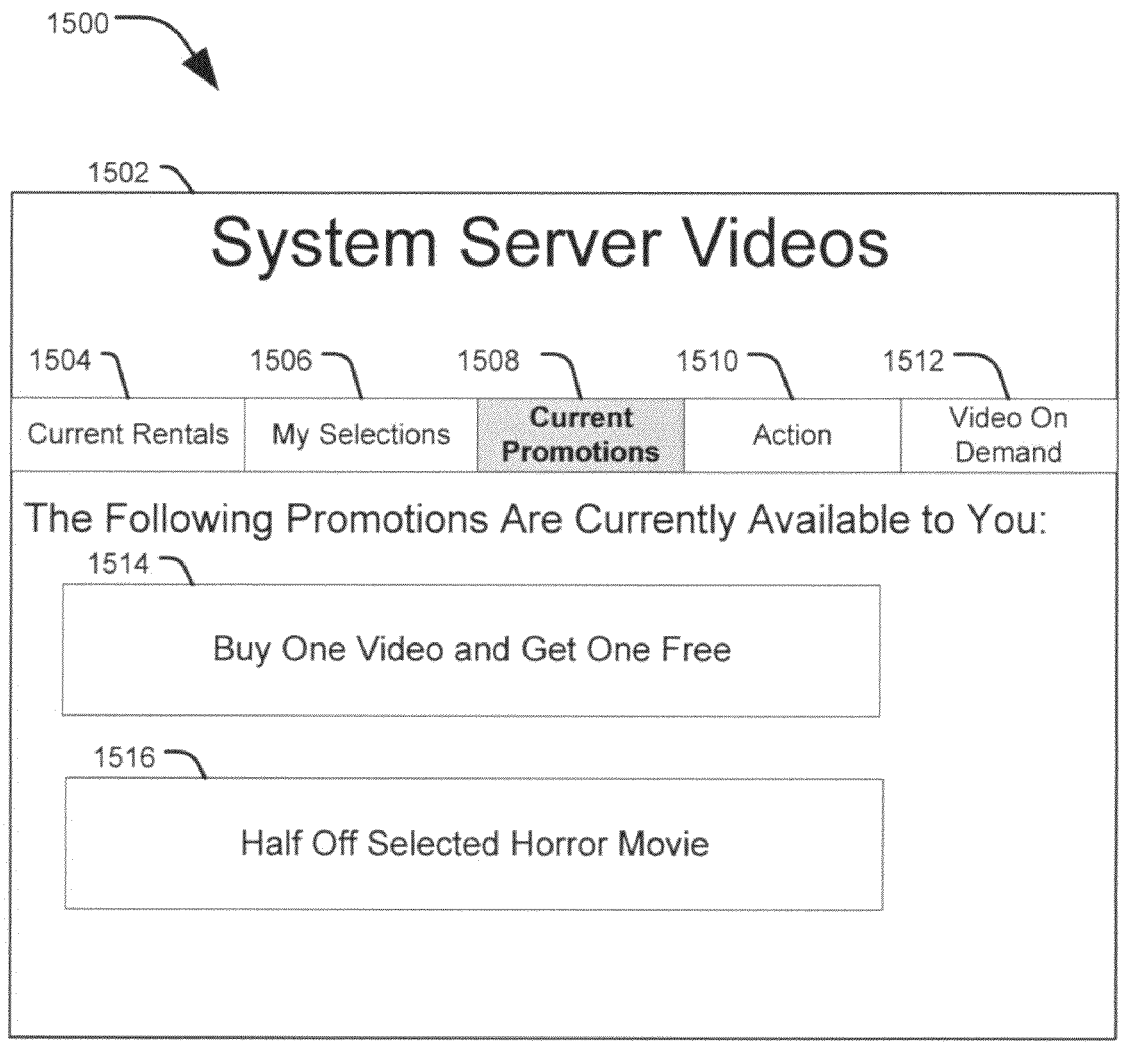
FIG. 15 is a block diagram of a particular illustrative embodiment of a graphical user interface to present assets related to media content.

FIG. 15 is a block diagram of a particular illustrative embodiment of a graphical user interface (GUI) 1500 to present assets related to media content. The GUI 1500 includes a window 1502 having multiple selectable indicators, including a "Current Rentals" tab 1504, a "My Selections" tab 1506, a "Current Promotions" tab 1508, an "Action" tab 1510, and a "Video on Demand" tab 1512. The current promotions tab 1508 is selected. The window 1502 also includes a "Buy One Video and Get One Free" option 1514 and a "Half Off Selected Horror Movie" option 1516. A server system, such as the server system of FIG. 3 may provide the graphical user interface to a set-top box device or other user device, which can render the GUI at a display device. A user may interact with the selectable options to purchase a video, to view current rentals, to view selections, current promotions, and to view other options.

Figure 16:
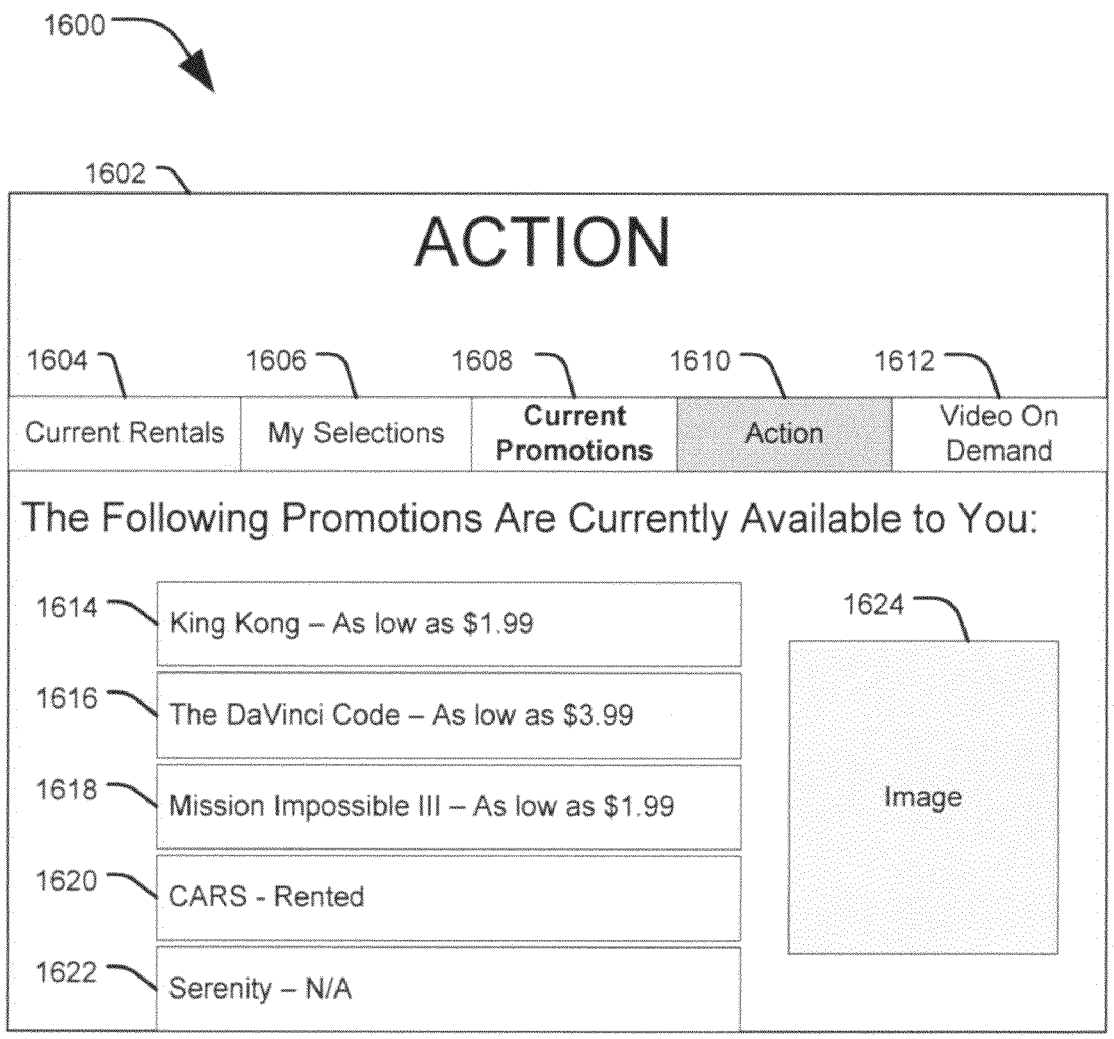
FIG. 16 is a block diagram of a second particular illustrative embodiment of a graphical user interface to present assets related to media content.

FIG. 16 is a block diagram of a second particular illustrative embodiment of a graphical user interface (GUI) 1600 to present assets related to media content. The GUI 1600 includes a window 1602 having multiple selectable options. The window 1602 includes a "Current Rentals" tab 1604, a "My Selections" tab 1606, a "Current Promotions" tab 1608, an "Action" tab 1610, and a "Video on Demand" tab 1612. The action tab 1610 is selected. The window 1602 also includes multiple selectable options to choose particular video content, including "King Kong—As low as $1.99" option 1614, "The DaVinci Code—As low as $3.99" option 1616, a "Mission Impossible III—As low as $1.99" option 1618, a "CARS—Rented" option 1620, and a "Serenity" option 1622. The Serenity option 1622 is indicated to not be available. Additionally, the window 1602 may include an image 1624 related to a selected option. Selection of one of the selectable options 1614, 1616, or 1618 may cause the user device to send a purchase request to an electronic storefront of a server system. Selection of the CARS-rented option 1620 may cause the user device to transmit a consume Video-on-Demand (VOD) message to the electronic storefront.

Figure 17:
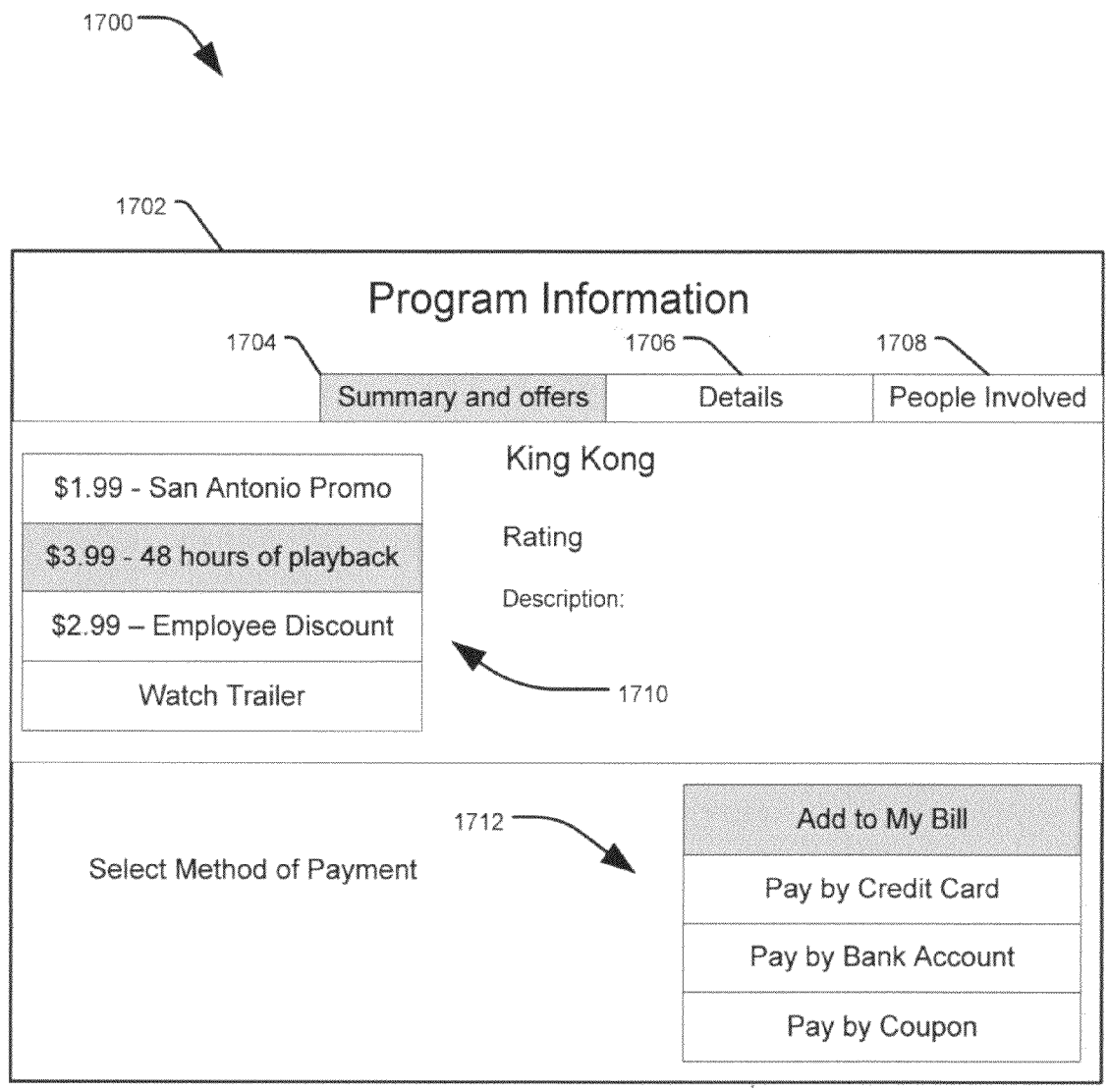
FIG. 17 is a block diagram of a third particular illustrative embodiment of a graphical user interface to present assets related to media content.

FIG. 17 is a block diagram of a third particular illustrative embodiment of a graphical user interface 1700 to present assets related to media content. The graphical user interface 1700 includes a window 1702 that has multiple selectable options. The multiple selectable options can include a "Summary and Offers" tab 1704, a "Details" tab 1706, and a "People Involved" tab 1708, which can be access to display data about a selected video option. In a particular illustrative embodiment, the "Summary and offers" tab 1704 is selected, and multiple selectable options 1710 are display in relation to the video "King Kong." In particular, the multiple selectable options 1710 include a "$1.99—San Antonio Promotion" option, a "$3.99—48 hours of playback" option, a "$2.99—Employee Discount" option, and a "Watch Trailer" option. Additionally, the window 1602 includes multiple payment options 1712, including an "Add to My Bill" option, a "Pay by Credit Card" option, a "Pay by Bank Account" option, and a "Pay by Coupon" option. A user can interact with the graphical user interface 1700 to select a particular video option and to select a desired payment option.

Figure 18:
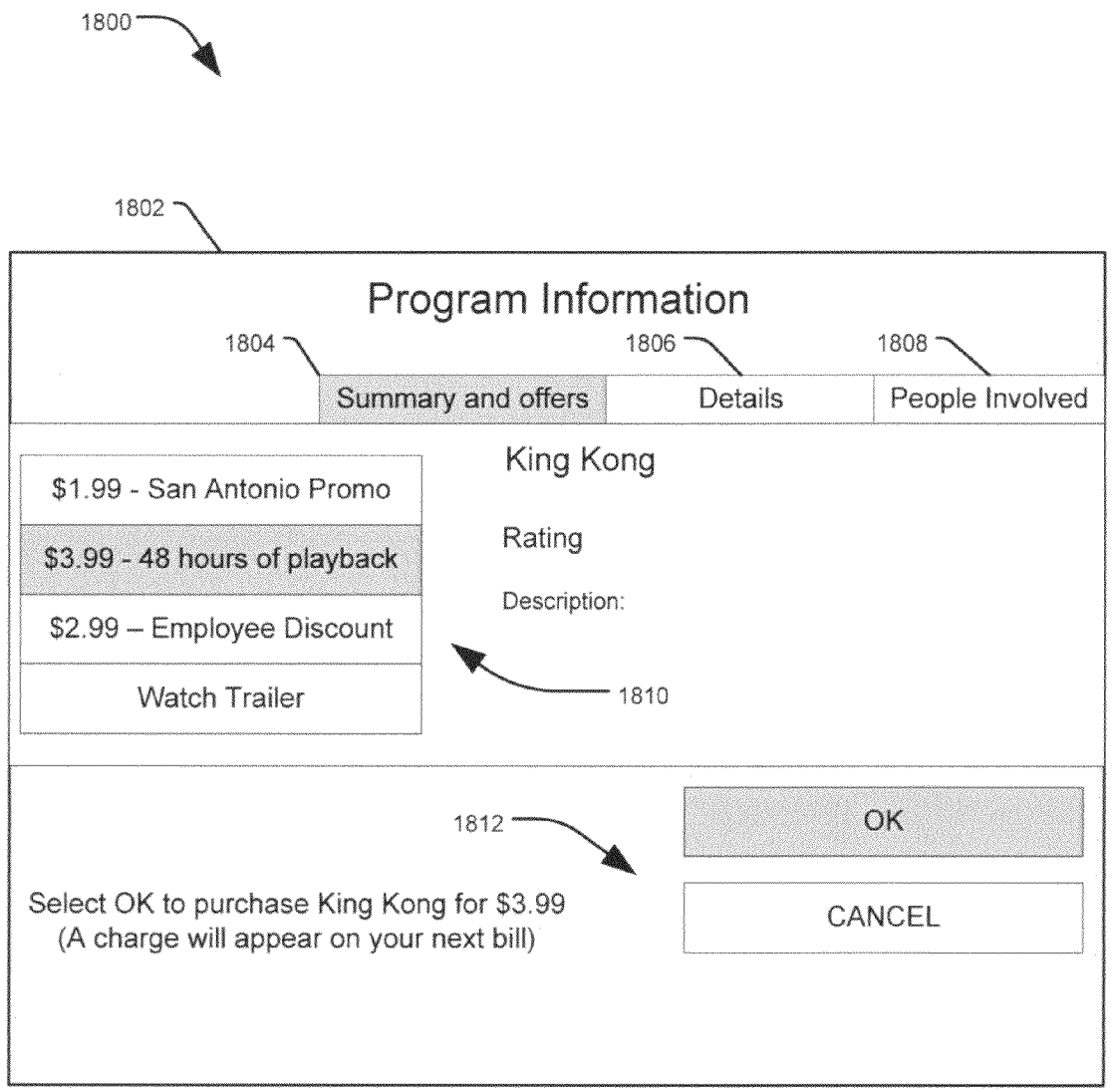
FIG. 18 is a block diagram of a fourth particular illustrative embodiment of a graphical user interface to present assets related to media content.

FIG. 18 is a block diagram of a fourth particular illustrative embodiment of a graphical user interface 1800 to present assets related to media content. The graphical user interface 1800 includes a window 1802 that has multiple selectable options. The multiple selectable options can include a "Summary and Offers" tab 1804, a "Details" tab 1806, and a "People Involved" tab 1808, which can be access to display data about a selected video option. In a particular illustrative embodiment, the "Summary and offers" tab 1804 is selected, which includes multiple selectable options 1810 related to the video "King Kong." In particular, the multiple selectable options 1810 include a "$1.99—San Antonio Promotion" option, a "$3.99—48 hours of playback" option, a "$2.99—Employee Discount" option, and a "Watch Trailer" option. The "$3.99—48 Hours of playback" option is selected, and the window 1802 displays a confirmation panel with selectable options 1812 to "OK" the purchase or to "Cancel" the purchase.

Figure 19:
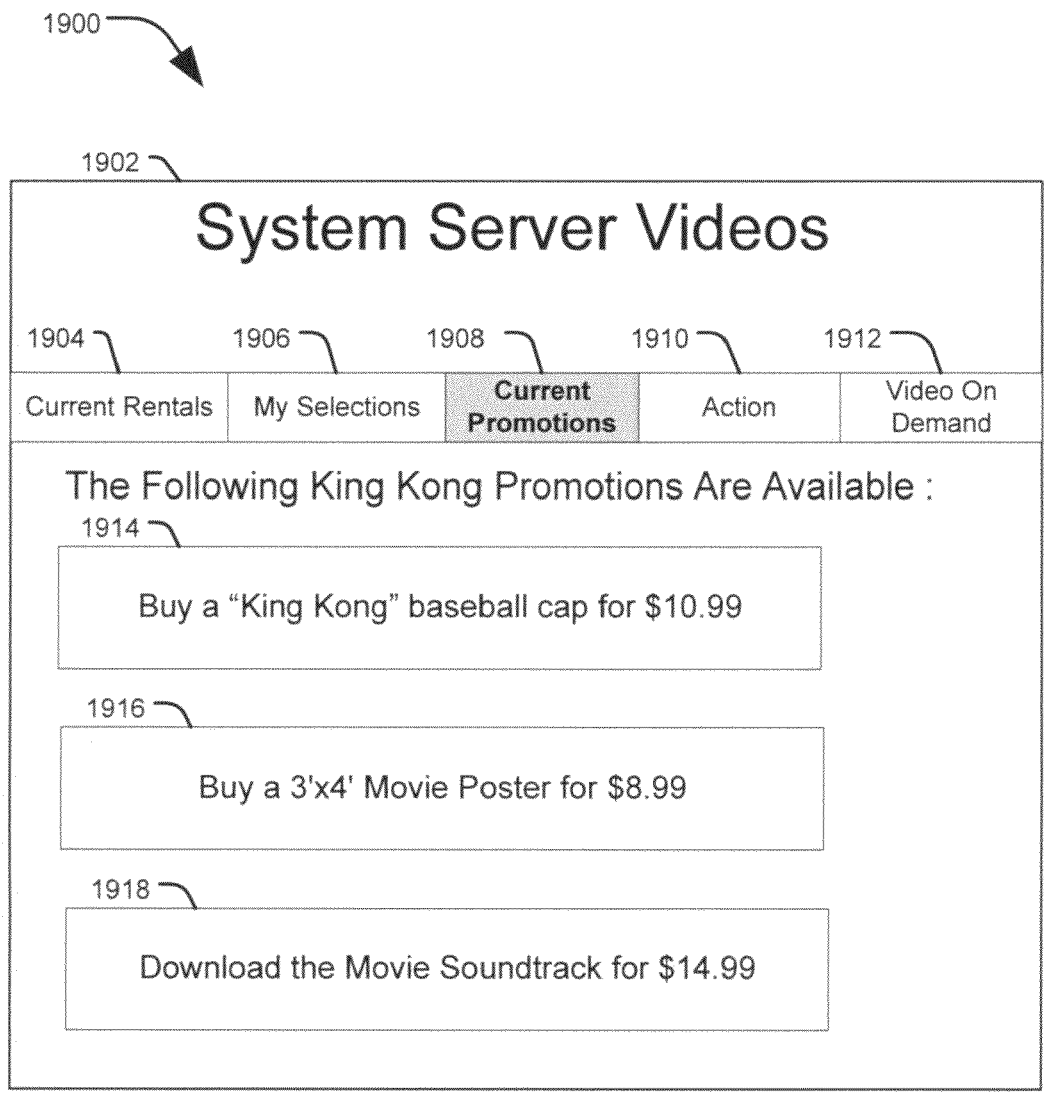
FIG. 19 is a block diagram of a fifth particular illustrative embodiment of a graphical user interface to present assets related to media content.

FIG. 19 is a block diagram of a fourth particular illustrative embodiment of a graphical user interface (GUI) 1900 to present assets related to media content. The GUI 1900 includes a window 1902 having multiple selectable indicators, including a "Current Rentals" tab 1904, a "My Selections" tab 1906, a "Current Promotions" tab 1908, an "Action" tab 1910, and a "Video on Demand" tab 1912. The current promotions tab 1508 is selected. The window 1502 also includes a "Buy a 'King Kong' baseball cap for $10.99" option 1914, a "Buy a 3'×4' Movie Poster for $8.99" option 1916, and a "Download the Movie Soundtrack for $14.99" option 1918. A server system, such as the server system of FIG. 3 may provide the graphical user interface to a set-top box device or other user device, which can render the GUI at a display device. A user may interact with the selectable options to purchase a physical asset, such as the baseball cap option 1914 or the movie poster option 1916. Additionally, the user may interact with the selectable options to download an electronic asset, such as the soundtrack, a ring tone, digital wallpaper, or another electronic asset.

In conjunction with the configuration of structure described herein, the system and method disclosed present assets related to media content to one or more destination devices via a network. In a particular illustrative embodiment, a server system sends media content to a destination device that includes a selectable trigger. The server system receives a request for an electronic storefront that is related to the selectable trigger. The server system dynamically generates or retrieves a graphical user interface including an electronic storefront having multiple selectable options related to assets that are associated with the media content. The assets may be selected from a plurality of assets based on the request. The server system can transmit the graphical user interface to a destination device, such as a computer, a set-top box device, or other computing device. The graphical user interface may include multiple purchase options, such as credit, debit, coupon, or other payment and promotional options to sell assets. The assets may include video, audio, soundtrack, ring tones, or other electronic assets. In a particular illustrative embodiment, the assets may include physical assets, such as articles of clothing to cross-promote physical products that are related to video content.

Figure 20:
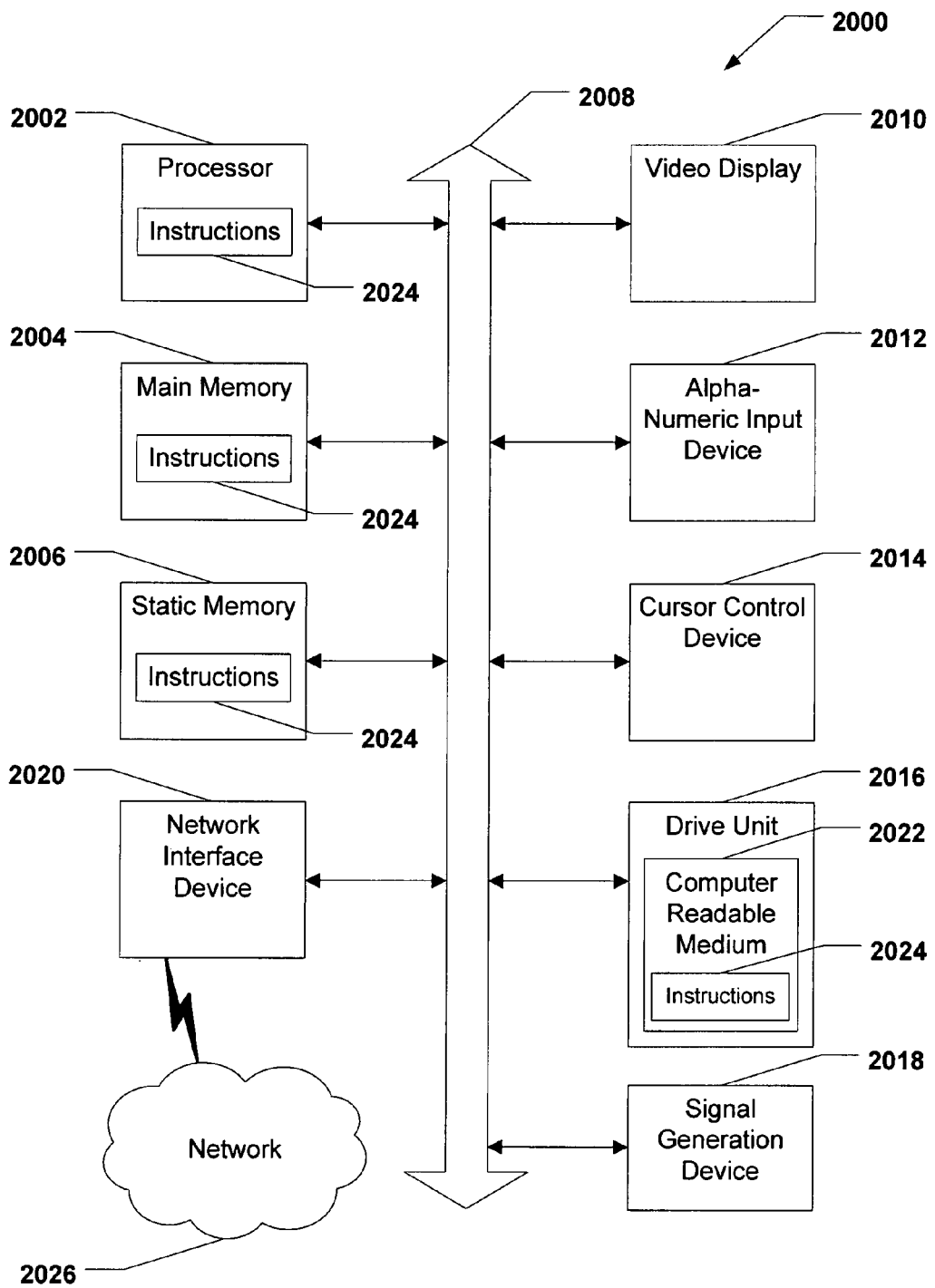
FIG. 20 is a block diagram of a particular illustrative embodiment of a general computing system.

FIG. 20 is a block diagram of a particular illustrative embodiment of a general computing system. Referring to FIG. 20, an illustrative embodiment of a general computer system is shown and is designated 2000. The computer system 2000 can include a set of instructions that can be executed to cause the computer system 2000 to perform any one or more of the methods or computer based functions disclosed herein. The computer system 2000 may operate as a standalone device or may be connected, e.g., using a network, to other computer systems or peripheral devices, such as an Internet Protocol Television (IPTV) system, a server system, a content source, and electronic storefront server, other devices, or any combination thereof. Additionally, in a particular illustrative embodiment, the computing system 2000 can communicate with other computing devices via a local area network, a wireless network, or a public network, such as the Internet.

In a networked deployment, the computer system may operate in the capacity of a server or as a client user computer in a server-client user network environment, or as a peer computer system in a peer-to-peer (or distributed) network environment. The computer system 2000 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 2000 can be implemented using electronic devices that provide voice, video or data communication. Further, while a single computer system 2000 is illustrated, the term "system" shall also be taken to include any collection of systems or sub-systems that individually or jointly execute a set, or multiple sets, of instructions to perform one or more computer functions.

As illustrated in FIG. 20, the computer system 2000 may include a processor 2002, e.g., a central processing unit (CPU), a graphics processing unit (GPU), or both. Moreover, the computer system 2000 can include a main memory 2004 and a static memory 2006, that can communicate with each other via a bus 2008. As shown, the computer system 2000 may further include a video display unit 2010, such as a liquid crystal display (LCD), an organic light emitting diode (OLED), a flat panel display, a solid state display, or a cathode ray tube (CRT). Additionally, the computer system 2000 may include an input device 2012, such as a keyboard, and a cursor control device 2014, such as a mouse. The computer system 2000 can also include a disk drive unit 2016, a signal generation device 2018, such as a speaker or remote control, and a network interface device 2020.

In a particular embodiment, as depicted in FIG. 20, the disk drive unit 2016 may include a computer-readable medium 2022 in which one or more sets of instructions 2024, e.g. software, can be embedded. Further, the instructions 2024 may embody one or more of the methods or logic as described herein. In a particular embodiment, the instructions 2024 may reside completely, or at least partially, within the main memory 2004, the static memory 2006, and/or within the processor 2002 during execution by the computer system 2000. The main memory 2004 and the processor 2002 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 2024 or receives and executes instructions 2024 responsive to a propagated signal, so that a device connected to a network 2026 can communicate voice, video or data over the network 2026. Further, the instructions 2024 may be transmitted or received over the network 2026 via the network interface device 2020.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile rewritable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely, representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of presenting assets related to media content, the method comprising:
    sending video content to a mobile device;
    receiving data indicating a request for an electronic storefront at a server system via a selection of a selectable trigger from the mobile device via a communication network;
    in response to receiving the data indicating the request:
        identifying, using a processor of the server system, the video content associated with the selectable trigger based at least in part on an identifier of the video content within the request;
        sending data to the mobile device regarding an asset that is related to the video content, downloadable at a second device that is distinct from the mobile device, and associated with a subscriber account of the mobile device; and
        sending, from the server system to the mobile device, a recommendation of a particular payment method for purchasing the asset, wherein the recommendation is based on an expiration date associated with the particular payment method;
    after sending the data regarding the asset, receiving from the mobile device an indication of a purchase of the asset; and
    in response to receiving the indication, automatically sending a grant message authorizing sending the asset to the second device.

2. The method of claim 1, wherein the electronic storefront includes a plurality of different purchase options related to a plurality of assets.

3. The method of claim 2, further comprising receiving at the server system a selection of one of the plurality of different purchase options from the mobile device.

4. The method of claim 2, wherein the plurality of assets includes a physical asset.

5. The method of claim 1, further comprising identifying the mobile device at the server system based on the received data indicating the request for the electronic storefront.

6. A system to present assets related to media content, the system comprising:
    a storefront server having processing logic and memory accessible to the processing logic, wherein the memory includes instructions executable by the processing logic to:
    send video content to a mobile device;
    receive data indicating a request for an electronic storefront via a selection of a selectable trigger from the mobile device;
    in response to receiving the data indicating the request:
        identify the video content associated with the selectable trigger based at least in part on an identifier of the video content within the request;
        send, to the mobile device, data regarding an asset that is related to the video content and downloadable at a the second device that is distinct from the mobile device and that is associated with a subscriber account of the mobile device; and
        send, to the mobile device, a recommendation of a particular payment method for purchasing the asset, the recommendation based on an expiration date associated with the particular payment method;
    after sending the data regarding the asset, receive from the mobile device an indication of a purchase of the asset; and
    in response to receiving the indication, automatically send a grant message authorizing sending the asset to the second device.

7. The system of claim 6, further comprising a mobile portal interface to a network, wherein the storefront server provides the electronic storefront to the mobile device via the mobile portal interface.

8. The system of claim 7, further comprising an interface to a private access network of an internet protocol television system, wherein the second device can access assets via the private access network of the internet protocol television system.

9. The system of claim 6, wherein the electronic storefront includes a plurality of different purchase options related to the asset.

10. The system of claim 9, wherein the plurality of different purchase options includes a first option to purchase the asset for a one-time viewing, a second option to purchase the asset for a period of time, and a third option to purchase the asset at a discounted rate.

11. The system of claim 6, wherein the electronic storefront includes a plurality of different payment options related to the asset, and wherein the plurality of different payment options includes a first option that is selectable to pay for the asset by debiting the subscriber account, a second option that is selectable to pay for the asset by charging a credit card, and a third option that is selectable to pay for the asset using a coupon code.

12. The system of claim 6, wherein the electronic storefront includes a plurality of assets related to the video content and the plurality of assets includes a physical asset.

13. The system of claim 12, wherein the physical asset comprises an article of clothing.

14. A non-transitory computer-readable medium comprising operational instructions executable by a processor to:
send video content to a first device;
receive, via a communication network, data indicating a request for an electronic storefront via a selection of a selectable trigger from the first device;
in response to receiving the data indicating the request:
identify the video content associated with the selectable trigger based at least in part on an identifier of the video content within the request;
send, to the first device, data regarding an asset that is related to the video content, downloadable at a second device that is distinct from the first device, and associated with a subscriber account of the first device;
send, to the first device, a recommendation of a particular payment method for purchasing the asset, the recommendation based on an expiration date associated with the particular payment method;
after sending the data regarding the asset, receive from the first device an indication of a purchase of the asset; and
in response to receiving the indication, automatically send a grant message authorizing sending the asset to the second device.

15. The computer-readable medium of claim 14, wherein the electronic storefront includes a plurality of different purchase options related to a plurality of assets, wherein at least one of the plurality of different purchase options includes an option to charge the subscriber account, wherein the subscriber account is associated with a private access network of an internet protocol television system and is associated with a mobile communication network.

16. The method of claim 1, further comprising sending the grant message to a remote content provider in response to receiving the indication to cause the remote content provider to send the asset to the second device.

17. The method of claim 1, further comprising:
generating a billing event at the server system; and
adding the billing event to a subscriber bill for the subscriber account, the subscriber bill including charges incurred for communication services provided via the communication network.

18. The system of claim 10, wherein each of the plurality of different purchase options is associated with a purchase price, and wherein at least one purchase price is selected based on information associated with the subscriber account and based on offer management rules.

19. The system of claim 18, wherein the information associated with the subscriber account that is used to select the at least one purchase price includes at least one of a length of service of the subscriber account, a time of day, and a type of the subscriber account.

20. The system of claim 6, wherein the recommendation of the particular payment method is further based on an active promotion.

21. The system of claim 11, further comprising instructions executable by the processing logic to determine the plurality of different payment options based at least partially on a credit limit associated with the subscriber account.

* * * * *

UNITED STATES PATENT AND TRADEMARK OFFICE
CERTIFICATE OF CORRECTION

PATENT NO. : 8,290,827 B2
APPLICATION NO. : 11/728046
DATED : October 16, 2012
INVENTOR(S) : David J. Piepenbrink et al.

Page 1 of 1

It is certified that error appears in the above-identified patent and that said Letters Patent is hereby corrected as shown below:

In the Claims, Column 26, Claim 6, Line 42, "related to the video content and downloadable at a the" should read --related to the video content and downloadable at a--.

Signed and Sealed this
Twentieth Day of August, 2013

Teresa Stanek Rea
*Acting Director of the United States Patent and Trademark Office*